United States Patent
Ainslie et al.

(10) Patent No.: US 10,698,578 B1
(45) Date of Patent: Jun. 30, 2020

(54) USER INTERFACE FOR AN APPLICATION DISPLAYING PAGE PERMISSIONS

(71) Applicant: Google LLC, Mountain View, CA (US)

(72) Inventors: Alex Neely Ainslie, San Francisco, CA (US); Ruby Lee, San Francisco, CA (US); John Nicholas Jitkoff, Palo Alto, CA (US)

(73) Assignee: Google LLC, Mountain View, CA (US)

(*) Notice: Subject to any disclaimer, the term of this patent is extended or adjusted under 35 U.S.C. 154(b) by 135 days.

(21) Appl. No.: 15/652,197

(22) Filed: Jul. 17, 2017

Related U.S. Application Data

(63) Continuation of application No. 14/184,650, filed on Feb. 19, 2014, now Pat. No. 9,710,566.

(60) Provisional application No. 61/916,714, filed on Dec. 16, 2013.

(51) Int. Cl.
*G06F 3/0484* (2013.01)
*G06F 3/0482* (2013.01)
*G06F 16/955* (2019.01)
*G06F 16/95* (2019.01)
*G06F 21/62* (2013.01)
*G06F 9/445* (2018.01)

(52) U.S. Cl.
CPC .......... *G06F 3/0484* (2013.01); *G06F 3/0482* (2013.01); *G06F 16/95* (2019.01); *G06F 16/9566* (2019.01); *G06F 21/62* (2013.01); *G06F 9/44526* (2013.01); *G06F 2221/2141* (2013.01)

(58) Field of Classification Search
CPC .. G06F 21/62; G06F 9/44526; G06F 16/9566; G06F 3/0484; G06F 3/0482; G06F 2221/2141
See application file for complete search history.

(56) References Cited

U.S. PATENT DOCUMENTS 6,232,972 B1  5/2001  Arcuri et al.
6,401,077 B1  6/2002  Godden et al.
(Continued)

FOREIGN PATENT DOCUMENTS

CN  103257968 A  8/2013

OTHER PUBLICATIONS

Amit Banerjee, "Google Chrome Updates to Improve Windows Battery Life, Adds Easier Website Permissions", Nov. 11, 2012, ampercent.com, all pages (Year: 2012).*
(Continued)

*Primary Examiner* — Kieu D Vu
*Assistant Examiner* — Roberto Borja
(74) *Attorney, Agent, or Firm* — Shumaker & Sieffert, P.A.

(57) ABSTRACT

Systems and methods for presenting information in a header region of an application are provided. In some aspects, a URL is received in an omnibox of an application window of a computer. A page corresponding to the URL is presented in a page display region of the application window. The URL is presented in the omnibox. A collapsed form of the URL and connection information associated with the page are presented in a button of the application window adjacent to the omnibox. The collapsed form of the URL includes a representation of a top-level domain and a hierarchy of the URL. The collapsed form of the URL includes different text from the URL.

20 Claims, 20 Drawing Sheets

(56) References Cited

U.S. PATENT DOCUMENTS

| | | | |
|---|---|---|---|
| 7,689,916 B1* | 3/2010 | Goel .................. | G06F 9/453 715/711 |
| 8,200,962 B1 | 6/2012 | Boodman et al. | |
| 8,549,585 B2 | 10/2013 | Dhanakshirur et al. | |
| 9,710,566 B2* | 7/2017 | Ainslie ............. | G06F 3/0484 |
| 2006/0218403 A1* | 9/2006 | Sauve ............... | H04L 63/126 713/175 |
| 2007/0124500 A1 | 5/2007 | Bedingfield et al. | |
| 2008/0109473 A1 | 5/2008 | Dixon et al. | |
| 2009/0222925 A1 | 9/2009 | Hilaiel et al. | |
| 2011/0116637 A1* | 5/2011 | Schiefelbein ...... | H04L 63/06 380/286 |
| 2011/0264992 A1 | 10/2011 | Vishria et al. | |
| 2011/0307941 A1 | 12/2011 | Dhanakshirur et al. | |
| 2012/0042362 A1* | 2/2012 | Vlasov .............. | G06F 21/604 726/4 |
| 2012/0066666 A1* | 3/2012 | Ng .................... | G06F 11/302 717/127 |
| 2012/0297469 A1 | 11/2012 | Reeder et al. | |
| 2013/0019159 A1 | 1/2013 | Civelli et al. | |
| 2014/0337424 A1* | 11/2014 | Lee .................. | H04L 63/0823 709/204 |

OTHER PUBLICATIONS

Lucian Parfeni, "Mockups of the Webcam and Mic Controls for WebRTC in Firefox 18", Sep. 17, 2012, Softpedia news, all pages (Year: 2012).*

Saubabh, "How to enable Java for particular website in Firefox by default", Mar. 21, 2013, Techotv.com, all pages (Year: 2013).*

Alice Wyman, "Page Info window", Aug. 6, 2012, Firefox.

Banerjee, "Google Chrome Updates to Improve Windows Battery Life, Adds Easier Website Permissions", Nov. 11, 2012, 1-2.

Banerjee, "Google Chrome Updates to Improve Windows Battery Life, Adds Easier Website Permissions," 2012, <http://www.ampercent.com/google-chrome-updates-to-improve-windows-bat- tery-life-adds-easier-website-permissions/10947/>.

Cww, "Enable and disable cookies that websites use to track your preferences", Jun. 16, 2012, Firefox.

European Search Report from European Application No. 14872062. 6, dated May 18, 2017.

Heddings, "How to Quickly Set Permissions for a Website in Google Chrome," Feb. 7, 2013, retrieved from https://www.howtogeek.com/137149/how-to-quidkly-set-permissions-for-a-web- -site-in-google-chrome/.

Kapila, "Firefox Browser How to: Delete Cookies of 1 Side Only," video [online] YouTube retrieved from internet <https://www.youtube.com/watch?v=CVEo7wug2ks>, Feb. 2012.

Lin et al., "Does domain highlighting help people identify phishing sites?," Human Factors in Computing Systems, ACM, May 7, 2011, pp. 2075-2084.

"Mozilla Firefox Web Browser—Geolocation in Firefox— Mozilla," Dec. 13, 2013, retrieved from https://web.archive.org/web/20131213064346/https://www.mozilla.org/en-US/- firefox/geolocation/.

Opera, "Guide to Security Information", Sep. 1, 2013, Opera, p. 1 and 2.

Chinese Office Action from Chinese Patent Application No. 201480068870.0, dated Feb. 24, 2018, 34 pages.

European Office Action from European Patent Application No. 14872062.6, dated Jul. 4, 2019, 8 pages.

International Search Report & Written Opinion from International Application No. PCT/US2014/040926, dated Dec. 2, 2014, 14 pp.

International Preliminary Report on Patentability from International Application No. PCT/US2014/040926, dated Jun. 21, 2016, 10 pp.

Response to Communication dated Jul. 4, 2019 from counterpart European Application No. 14872062.6, filed Nov. 13, 2019, 13 pp.

Prosecution History from U.S. Appl. No. 14/184,650, 145 pp.

Summons to attend Oral Proceedings pursuant to Rule 115(1) EPC from counterpart European Application No. 14872062.6, dated Mar. 4, 2020, 6 pp.

* cited by examiner

USER INTERFACE FOR AN APPLICATION DISPLAYING PAGE PERMISSIONS

This present application is a continuation of U.S. patent application Ser. No. 14/184,650, entitled "USER INTERFACE FOR WEBPAGE PERMISSION REQUESTS," filed on Feb. 19, 2014, issued as U.S. Pat. No. 9,710,566, which in turn claims the benefit of U.S. Provisional Application No. 61/916,714, entitled, "USER INTERFACE FOR AN APPLICATION DISPLAYING PAGES," filed on Dec. 16, 2013, the disclosures of which are hereby incorporated by reference in their entireties for all purposes.

BACKGROUND

The subject technology is generally directed to a user interface for an application displaying pages, for example, a web browser.

An application, for example, a web browser, may be user-customizable and include multiple features. However, the applications may have a simple user interface to allow a user to quickly access basic functions (e.g., loading a page by typing a uniform resource locator (URL) address). Approaches for informing the user about the user-customizable features without reducing the simplicity of the user interface may be desirable.

SUMMARY

In some aspects, the disclosed subject matter relates to a computer-implemented method for updating an operating system. The method includes receiving, in an omnibox of an application window of a computer, an input comprising a uniform resource locator (URL). The method includes presenting, in a page display region of the application window, a page corresponding to the URL. The method includes presenting, in the omnibox, the URL. The method includes presenting, in a chip of the application window adjacent to the omnibox, an essence of the URL and connection information associated with the page, the essence of the URL comprising a representation of a top-level domain and a hierarchy of the URL, the essence of the URL comprising different text from the URL.

In some aspects, the disclosed subject matter relates to a non-transitory computer-readable medium encoded with executable instructions. The instructions include code for instantiating an application window, the application window comprising a header region and a page display region, the header region comprising an omnibox. The instructions include code for receiving an input via the omnibox, where the input comprises a uniform resource locator (URL) or a search query. The instructions include code for presenting, in the page display region, a page in response to the received input. The instructions include code for presenting, in the header region and externally to the omnibox, one or more graphical elements, the graphical elements representing permissions granted to the page or extensions having access to the page, where the omnibox comprises text and lacks graphical elements distinct from the text.

In some aspects, the disclosed subject matter relates to a system. The system includes one or more processors and a memory. The memory includes instructions. The instructions include code for presenting a page within a page display region of an application. The instructions include code for receiving, via the page displayed within the page display region, a request for one or more permissions. The instructions include code for providing, within a bubble overlaying the page display region and adjacent to a header region of the application, a textual indication of the request for the one or more permissions. The instructions include code for receiving, via the bubble, a user input for granting or denying the request for at least one of the one or more permissions.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1A:
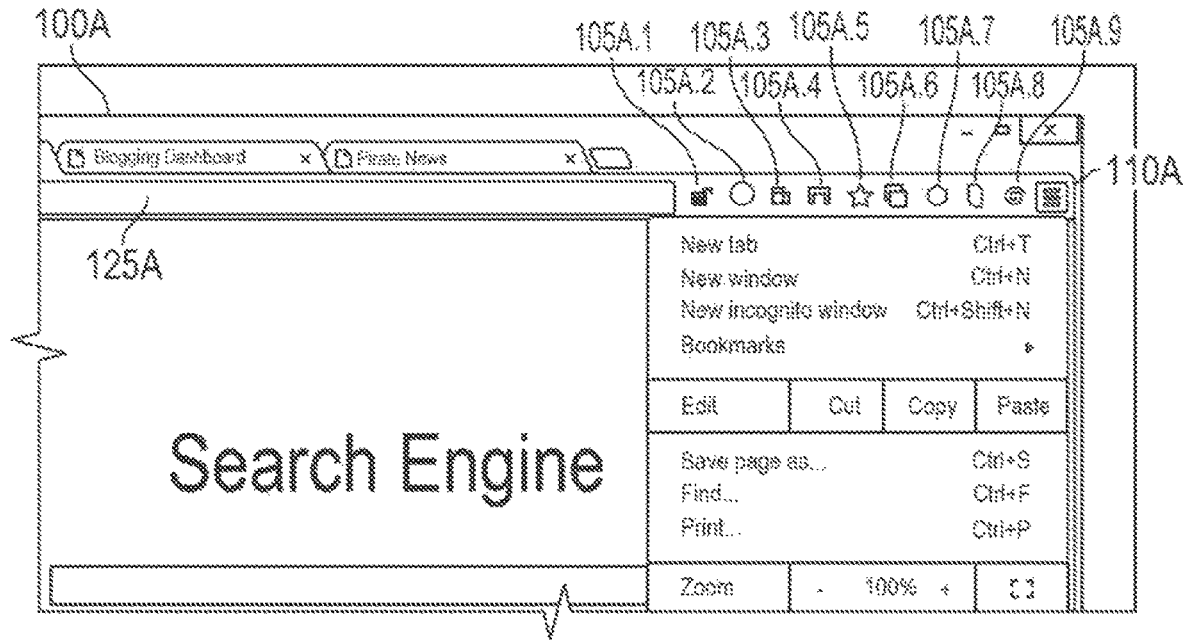
FIGS. 1A-1H illustrate example user interfaces for managing action and extension icons in an application.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

As set forth above, an application, such as a web browser, may include many user-customizable features. However, to simplify the user experience, the browser may present a very simple user interface. As a result, teaching the user about the user-customizable features, without reducing the simplicity of the user interface, may be desirable.

For instance, the application may include an omnibox in which a user may enter a uniform resource locator (URL) address or a search query. The omnibox may include an address bar. However, some users may not know that the omnibox may be used to enter a search query. As the foregoing illustrates, a new approach for informing a user about the functionality of the omnibox may be desirable.

Also, oftentimes, users access websites by selecting hyperlinks rather than entering a URL in an omnibox or URL input box. As a result, a user may be fooled into accessing an invalid or insecure website (e.g., xyzbank.badguys.com, where the user thinks he/she is accessing xyzbank.com) and providing sensitive login credentials or other information to the invalid website. As the foregoing illustrates, an approach for informing the user that he/she s accessing an invalid or insecure website may be desirable.

In some cases, a website or application may wish to access a resource on a user's computer. For example, a website of a search engine may wish to access a microphone to support voice search and/or a camera to support image-based search. However, the user may be unfamiliar with the interface for granting and modifying permissions for pages or applications. As the foregoing illustrates, a new user interface for granting and modifying permissions for pages or applications may be desirable. As used herein, the term "page" encompasses its plain and ordinary meaning. Among other things, the term "page" may refer to a website or webpage, a page of an application executing within a web browser (e.g., a page of a browser application for playing the card game solitaire) that may not necessarily require Internet access, a page in a document processing program, etc.

In some implementations, an application may include extension(s) or action icon(s) that were added to the application by the user, an enterprise administrator associated with the user, or a developer of the application. However, the user may be unaware of the existence or functionality of the extension(s) or action icon(s) or the impact (e.g., slower page loading) the extension(s) or action icon(s) are having on the user's experience with the application. As the foregoing illustrates, a new approach for presenting the extension(s) or action icon(s) and explaining their functionality and impact may be desirable. As used herein, the term action(s) and the term extension(s) are interchangeable.

Actions and extensions may include additional functionality added to an application (e.g., functionality to play a video on an external linked monitor, functionality to send an article to a linked tablet computer or electronic reader, etc.). In terms of actions and extensions, implementation(s) the subject technology may include deprecating page actions and treating page actions like browser actions. Browser actions may include creating a tooltip, a badge, or a popup, and page actions may include taking an action on a page (e.g., transmitting the page to an external device). Implementations of the subject technology may include treating some features of a browser, for instance, bookmarks, translation software, password saving, and casting to an external monitor, like actions. Implementations of the subject technology may include removing the toolbar overflow menu that appears when users drag the edge of the omnibox toward the overflow menu. Implementations of the subject technology may include allowing extensions to be pinned to the toolbar; extending toolbar reordering behavior to include dropping extension icons into the overflow menu to unpin the extension icons. Implementations of the subject technology may include making all extensions visible in the overflow menu, even the otherwise invisible ones.

FIGS. 1A-1H illustrate example user interfaces for managing action and extension icons in an application. The application may be a web browser or any other application.

FIG. 1A illustrates an example application window 100A displaying a page of a search engine. The application window displays multiple action and extension icons 105A.1-9 displayed in the toolbar as a result of a large amount of space in the toolbar 110A. The application window also include an omnibox 125A.

Figure 1B:
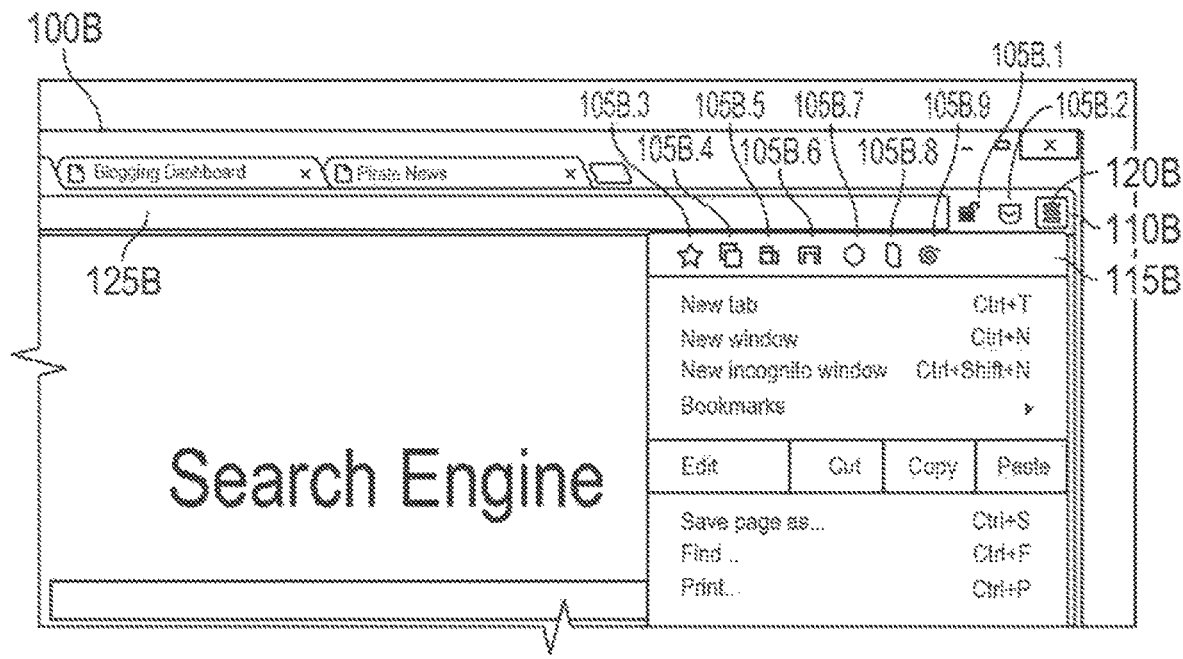

FIG. 1B illustrates an example application window 100B displaying a page of a search engine. Similarly to FIG. 1A, the application window 100B of FIG. 1B includes multiple action and extension icons 105B.1-9. However, due to the smaller size of the toolbar 110B, only action and extension icons 105B.1-2 are displayed in the toolbar 110B. The remaining action and extension icons 105B.3-9 are displayed in the overflow menu 115B, which may be presented in response to a selection of the overflow menu button 120B. The toolbar may be made smaller and the application window 100A may be changed into the application window 100B, for example, by dragging the edge of the omnibox 125A/125B in a specified direction (e.g., to the right) to make the toolbar smaller or by selecting a hide button (not illustrated).

Figure 1C:
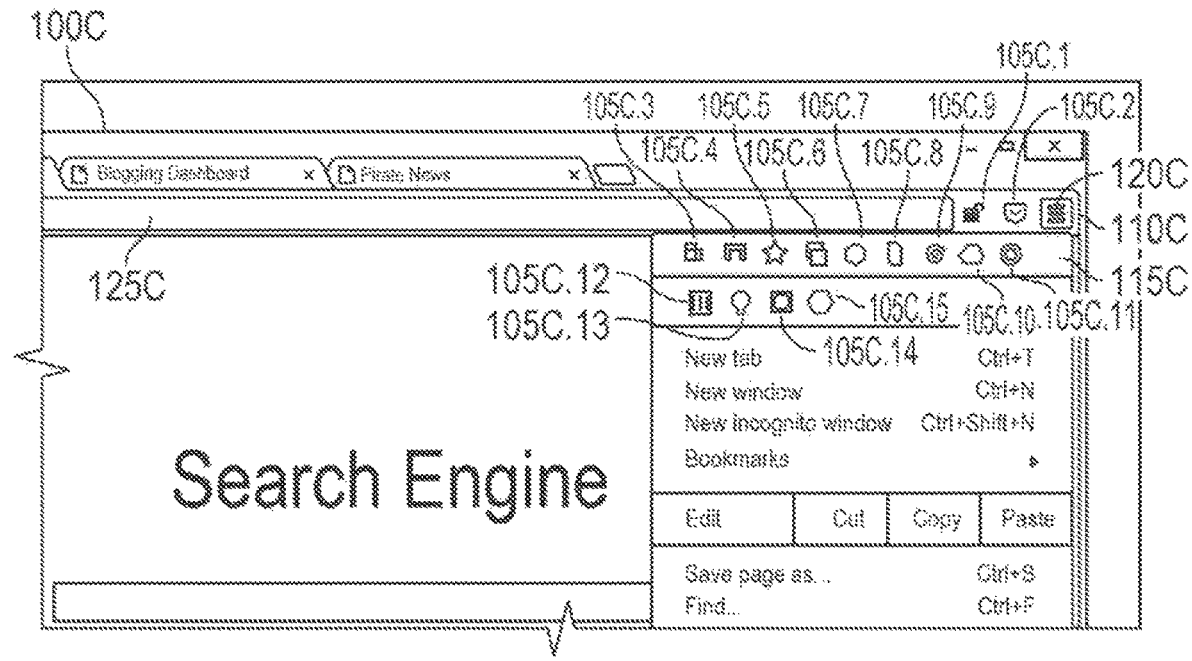

FIG. 1C illustrates an example application window 100C displaying a page of a search engine. Similarly to FIG. 1B, the application window 100C of FIG. 1C includes action and extension icons 105C.1-15, with action and extension icons 105C.1-2 displayed in the toolbar 110C and action and extension icons 105C.3-15 displayed in multiple rows of the overflow menu 115, which may be displayed in response to a selection of the overflow menu button 120C. The application window 100C also includes an omnibox 125C.

Figure 1D:
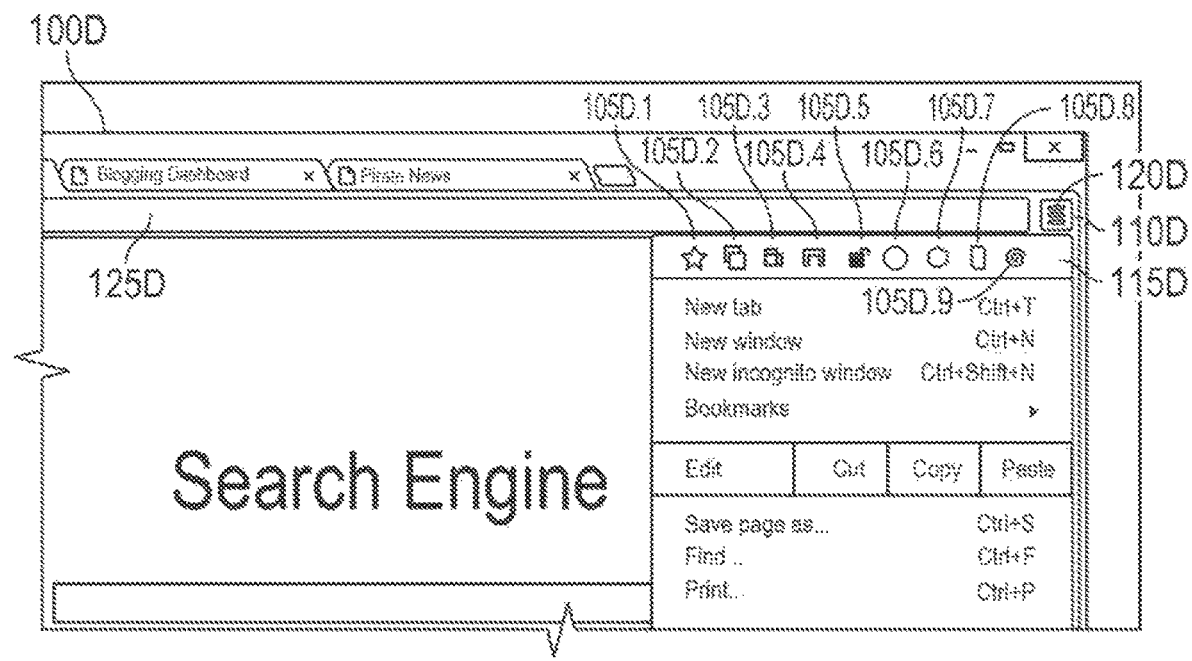

FIG. 1D illustrates an example application window 100D displaying a page of a search engine. Similarly to FIGS. 1A-1C, the application window 100D of FIG. 1D includes action and extension icons 105D.1-9 all of which are displayed in the overflow menu 115D and none of which are displayed in the toolbar 110D. The overflow menu 115D may be displayed in response to the selection of the overflow menu button 120D in the toolbar 110D. The user may cause the application windows of FIGS. 1A-1B to enter the state displayed in the application window 100D of FIG. 1D by, for example, by dragging the edge of the omnibox 125A/125B/125C/125D in a specified direction (e.g., to the right) to make the toolbar smaller or by selecting a hide button (not illustrated).

Figure 1E:
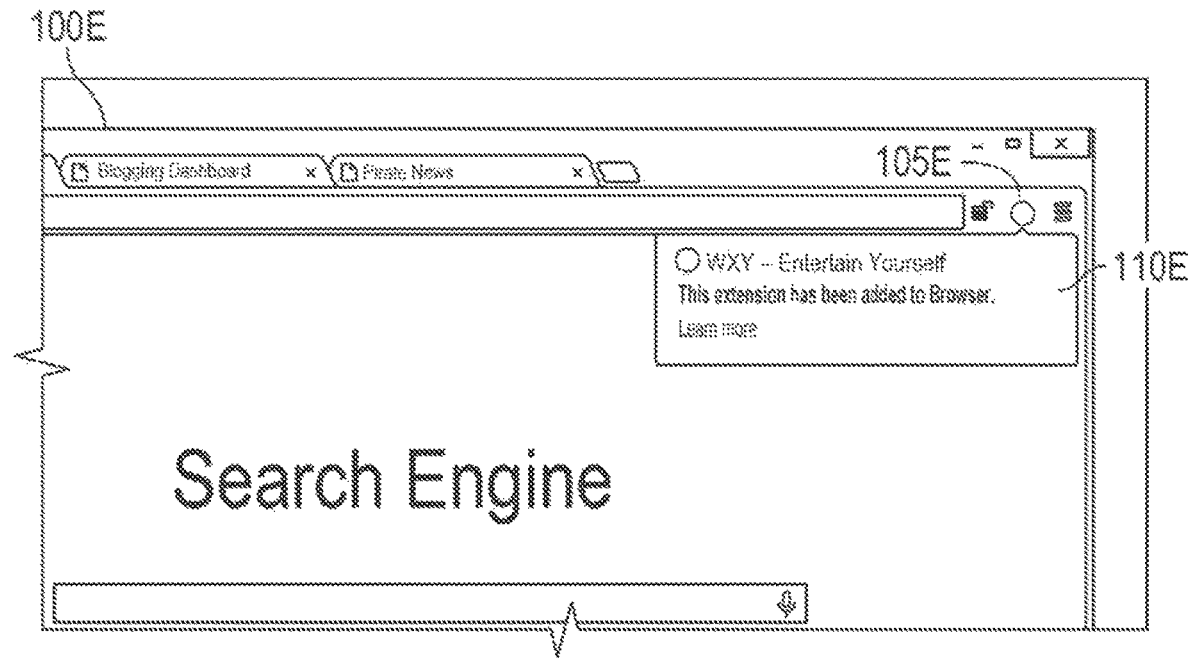

FIG. 1E illustrates an example application window 100E. As shown, an extension 105E called "WXY—Entertain Yourself" has been added to the application window 100E. The extension 105E may have been added by the user or by an enterprise administrator associated with the user. As a result of adding the extension 105E, the bubble 110E is displayed, informing the user that the extension has been added. New action and extension icons may be added to the toolbar by default. A user may explicitly hide an action in order to place it in the overflow menu.

Figure 1F:
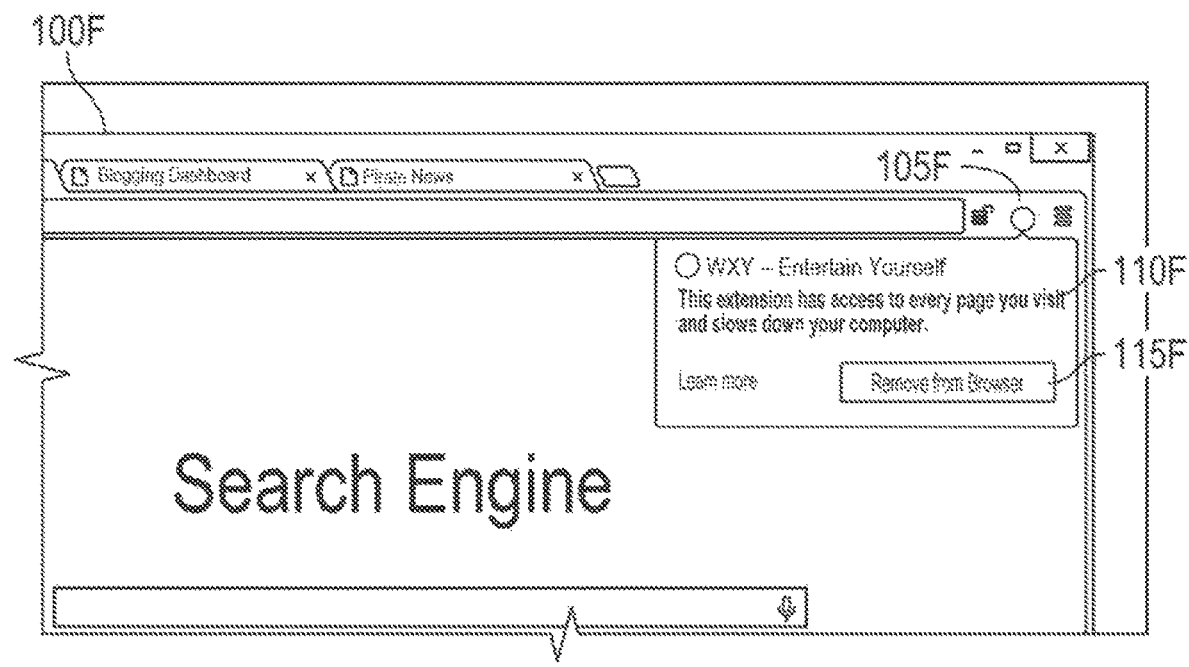

FIG. 1F illustrates an example application window 100F. As shown, an extension 105F called "WXY—Entertain Yourself" has been added to the application window 100F. The extension 105F may have been added by the user or by an enterprise administrator associated with the user. As a result of adding the extension 105F or of hovering a cursor over the extension 105F, the bubble 110F is displayed, informing the user that the extension has access to every page the user visits and slows down the computer. A button 115F for removing the extension from the application may be displayed. Certain actions or extensions, for example, actions or extensions that slow down other operations of the computer or application, may be made more visible by placing them on the toolbar rather than in the overflow menu. Furthermore, a bubble may be pointed to the action or extension explaining why the action or extension may be interesting and offering the user to remove the action or extension. Enterprise-added actions or extensions that repeatedly crash may be highlighted.

Figure 1G:
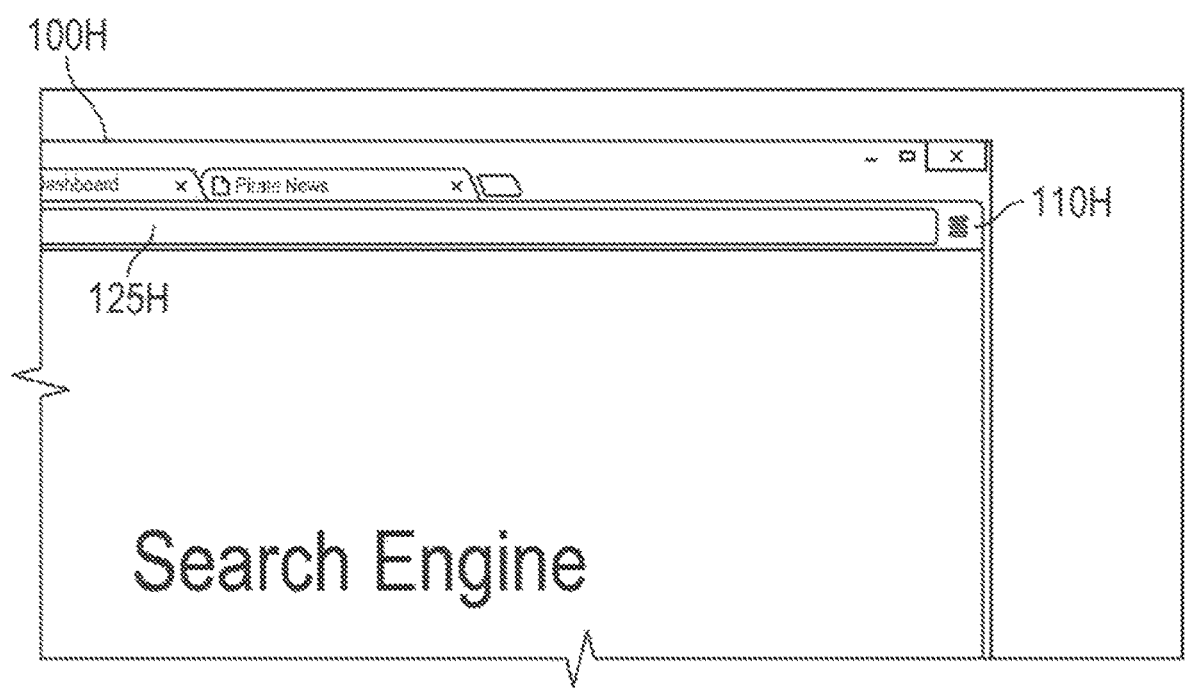

FIG. 1G illustrates an example application window 100G. No extensions are shown in the toolbar 110G of the application window 100G as the extensions are hidden. As result of the extensions being hidden, the omnibox 125G is expanded to occupy more space.

Figure 1H:
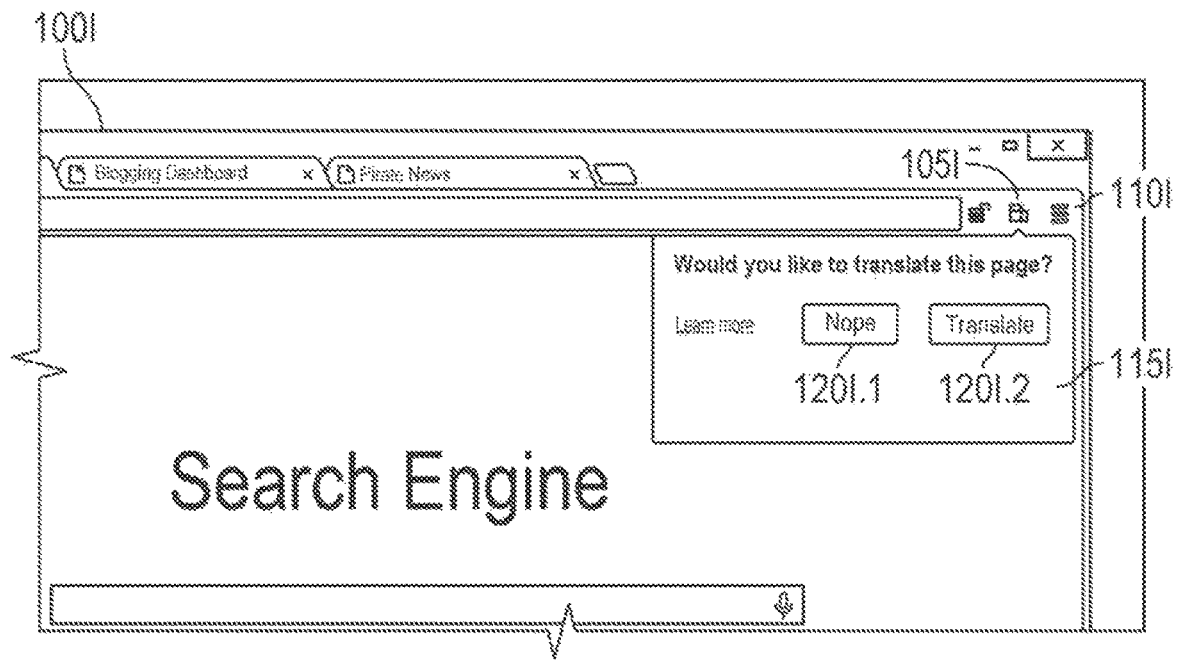

FIG. 1H illustrates an example application window 100H. The application window 100H includes a translation action icon 105H. Action icons may be shown or hidden to avoid taking up extra space on the toolbar 110H unnecessarily. The translation action icon 105H may be coupled with a bubble 115H that include the text "Would you like to translate this page?" The bubble 115H may include buttons 120H.1-2 to accept or reject the proposal to translate the page.

FIGS. 2A-2G illustrate example user interfaces for managing an application having an omnibox. The application may be a web browser or any other application.

An omnibox in an application merges the address and search fields. In other words, the omnibox may be used both to enter a URL address (e.g. "www.example.com") and to enter a search query (e.g., "hotels in New York"). Extensions may be added to an application to personalize the application. A bubble may be presented to allow a user to review or edit permissions given to the application or to a page in the application without accessing the settings menu. A page action may place an icon (e.g., a 16×16 pixel icon) inside the omnibox. A browser action may place an icon (e.g., a 19×19 pixel icon) in the toolbar to the right of the omnibox. The icons may be dynamic and/or animated. Unlike a browser action, a page action may be relevant to a currently displayed page, but not to all pages displayed by the application. A browser action may be relevant to all pages displayed by the application. Alternatively, a web browser may be implemented that does not distinguish between browser action(s) and page action(s) in terms of the behavior of the browser/page action(s) or how the browser/page action(s) are presented. Permissions may be displayed in a page information bubble. Permission prompts may be shown as bubbles (e.g., page action prompt bubbles) or as information bars. Alternatively, action(s) or extension(s) may be moved out of the omnibox, for example, into a chip that is in the toolbar and adjacent to (e.g., to the right of or to the left of) the omnibox. The chip may be a button.

Advantageously, as a result of some implementations of the subject technology, power users with multiple extensions may have control of their toolbar state. Also, extensions, particularly extensions having access to a page, may become more visible. Malicious extensions or extensions that require more than a threshold amount of random access memory (e.g., more than 10% of the random access memory available to the computer) may be visually indicated.

Figure 2A:
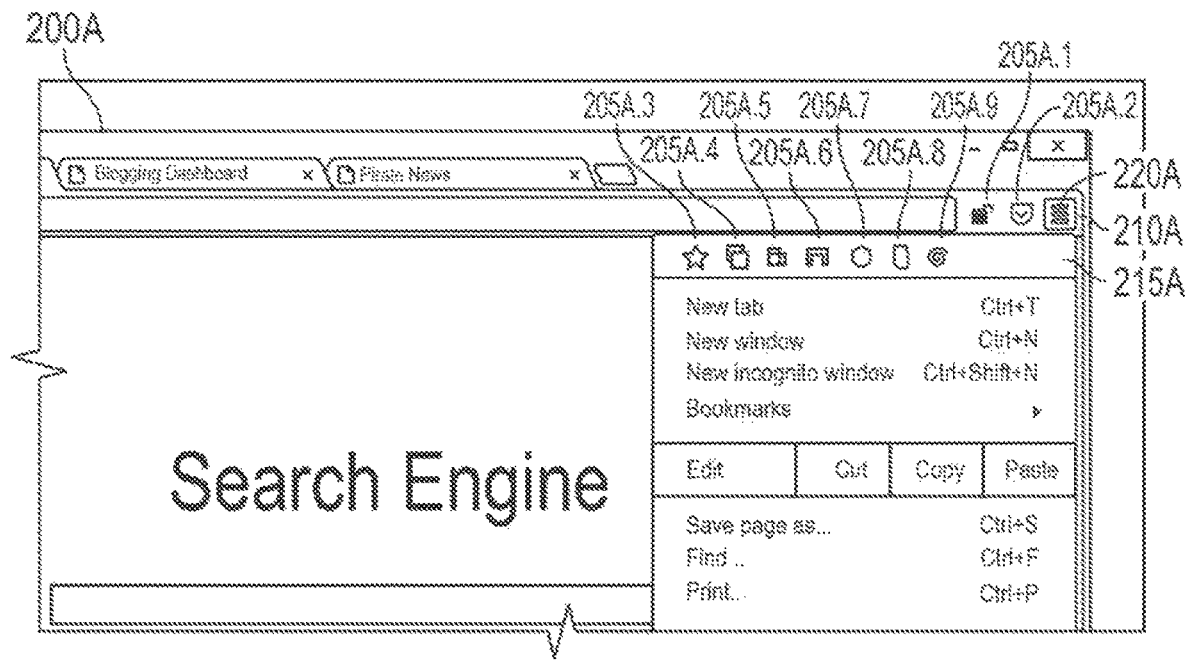
FIGS. 2A-2G illustrate example user interfaces for managing an application having an omnibox.

FIG. 2A illustrates an application window 200A. The application window 200A includes multiple action or extension icons 205A.1-9. Some action or extension icons 205A.1-2 are displayed on the toolbar 210A, while other action or extension icons 205A.3-9 are displayed in the overflow menu 215A, which is presented in response to selection of the overflow menu button 220A. The user may control which action or extension icons 205A.1-9 are shown in the toolbar 210, shown in the overflow menu 220, or hidden.

Figure 2B:
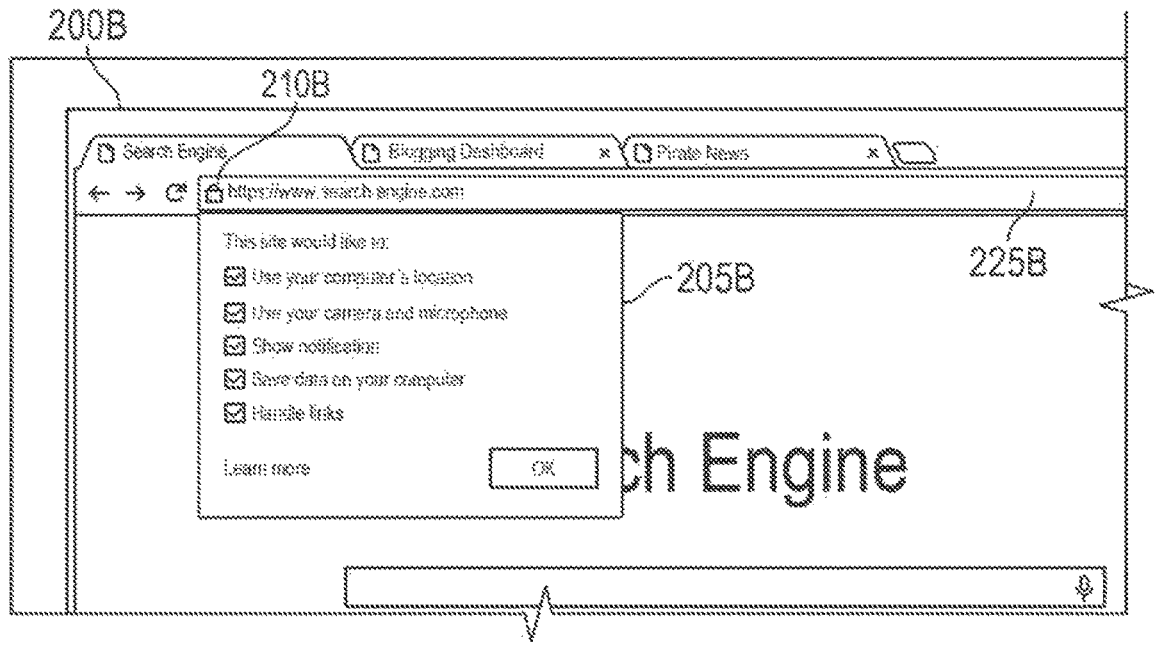

FIG. 2B illustrates an application window 200B. The application window 200B includes an omnibox 225B and a page information bubble 205B below the omnibox 225B. A lock icon 210B on the omnibox 205B indicates that the page displayed in an active tab of the application window 200B is secure. The page information bubble 205B includes prompts for permissions (e.g., "Use your computer's location," "Use your camera and microphone," etc.) that the user may grant or deny to the page by selecting or de-selecting the appropriate checkboxes. In some cases domain information or connection information (e.g., a lock icon and a background color representing the connection information) may be presented on the omnibox 205B in addition to or in place of the lock icon 210B. The connection information may represent, for example, an HTTP connection, an HTTPS connection, or a broken-HTTPS connection.

Figure 2C:
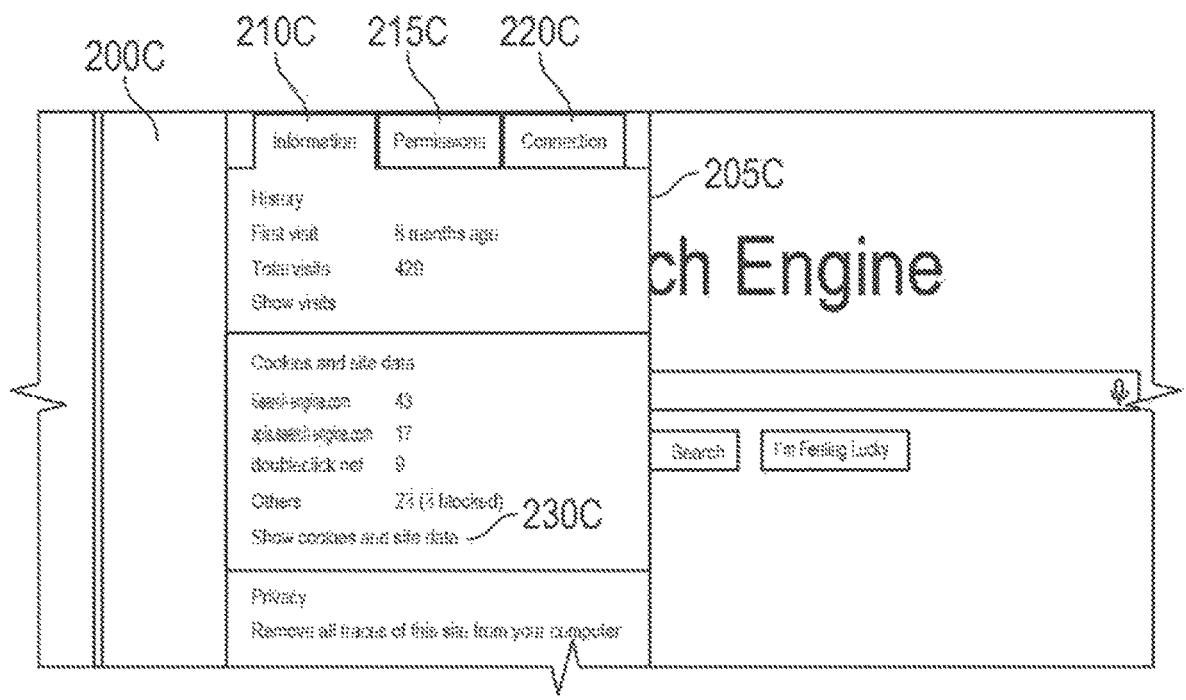

FIG. 2C illustrates an application window 200C with a page information bubble 205C. The page information bubble 205C includes tabs for information 210C, permissions 215C, and connection 220C, where the user may review or edit the associated information. As shown, the information tab 210C is selected. Cookie information may be displayed via a hyperlink 230C within the information tab 210C, rather than directly within the information tab 210C. Alternatively, cookie information may be displayed directly within the information tab 210C. In some cases, other information, different from or in addition to that set forth above, may be presented in the page information bubble 205C.

Figure 2D:
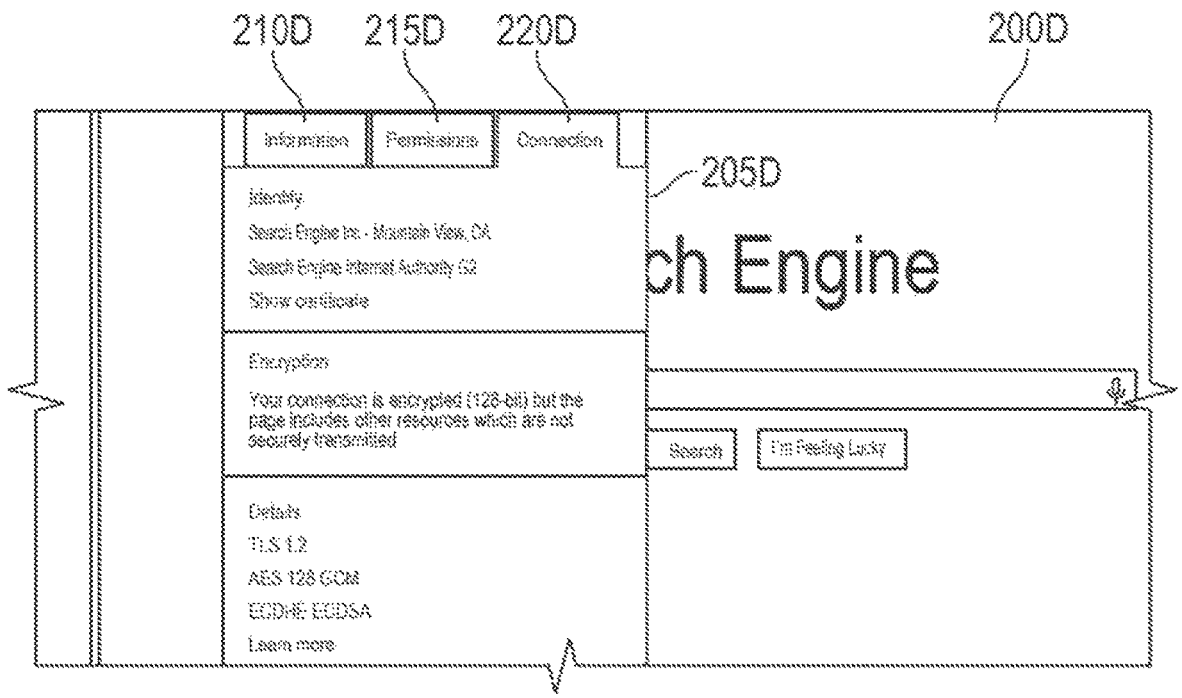

FIG. 2D illustrates an application window 200D with a page information bubble 205D. The page information bubble 205D includes tabs for information 210D, permissions 215D, and connection 220D, where the user may review or edit the associated information. As shown, the connection tab 210D is selected. The connection tab 210D includes identity, encryption, and certificate details. In some examples, one or more of the identity, encryption, or certificate details may be presented in the information tab 210D instead of the connection tab 220D.

Figure 2E:
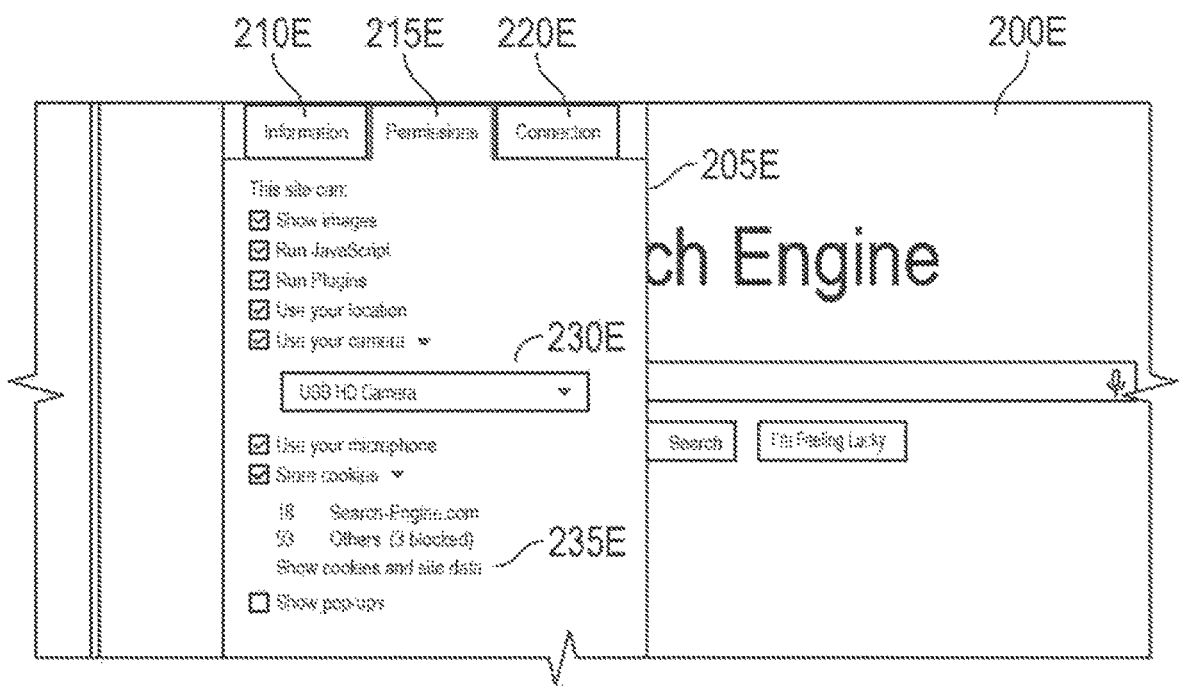

FIG. 2E illustrates an application window 200E with a page information bubble 205E. The page information bubble 205E includes tabs for information 210E, permissions 215E, and connection 220E, where the user may review or edit the associated information. As shown, the permissions tab 215E is selected. Within the permissions tab 215E, multiple checkboxes for granting or denying various permissions (e.g., "Show images," "Run JavaScript," etc.) to the currently displayed page are presented. In some cases, one or more of the checkboxes may be coupled with additional information or prompts. For example the "Use your camera" permission prompt may be coupled with a dropdown menu for selecting which of multiple cameras should be used. The "Store cookies" permission prompt may be coupled with an indication of cookies that are stored and/or a hyperlink for more information about the stored cookies.

Figure 2F:
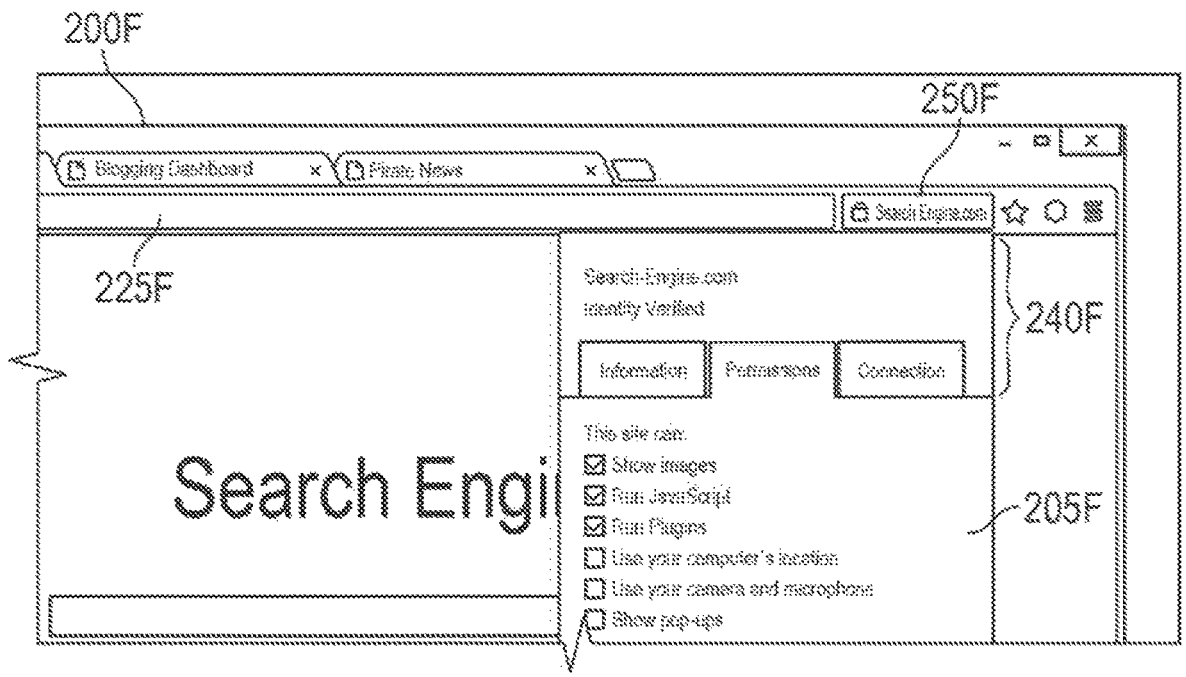

FIG. 2F illustrates an application window 200F having an omnibox 225 and a chip 250F adjacent to the omnibox. The chip 250F may display a top-level domain of a page displayed in the active tap of the application window 200F. The page information bubble 205F may be presented adjacent to the chip. The page information bubble 205F may include a header region 240F indicating the top-level domain and whether the identity of the page is verified. Also, the chip 250F may include a lock icon indicating that the page is secure. The header region 240F may include a toolbar and/or a tabstrip.

Figure 2G:
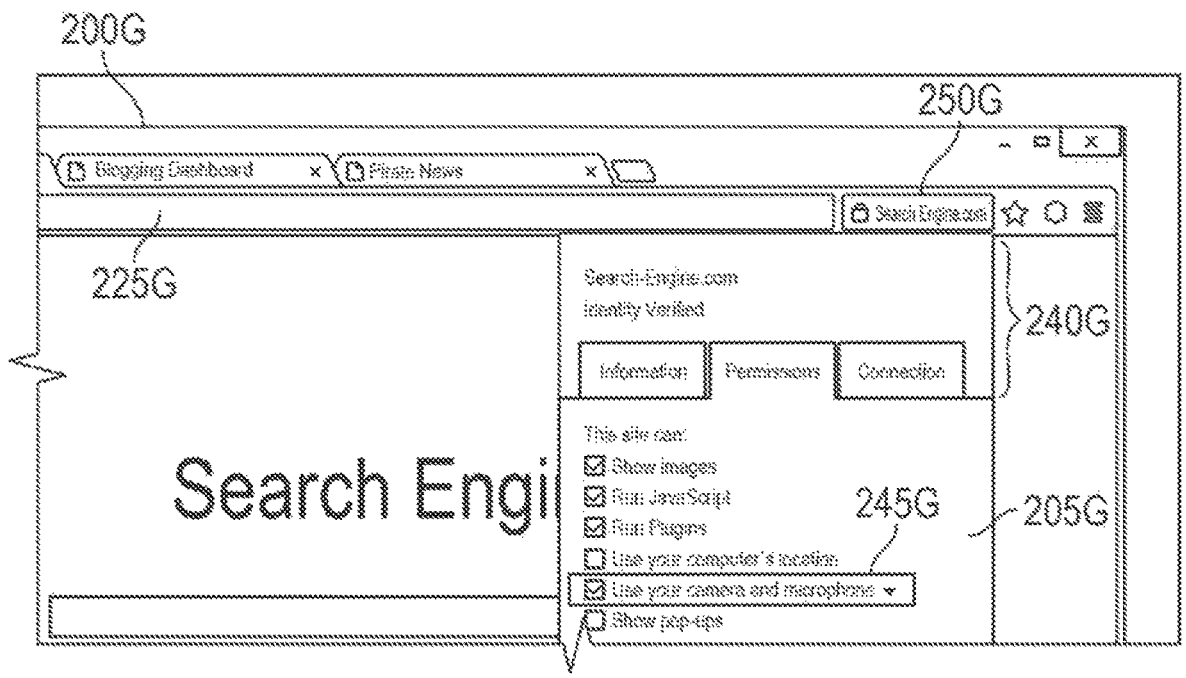

FIG. 2G is similar to FIG. 2F and illustrates an application window 200G having an omnibox 225G, a chip 250G, and a page information bubble 205G with a header region 240G. The permissions tab is displayed in the page information bubble 205G. A permission request 245G to which the user has not yet responded may be visually indicated, for example, by drawing a box around the permission request, as shown, or highlighting the permission request.

FIGS. 3A-3L illustrate example user interfaces for managing permissions of an application. The application may be a web browser or any other application.

Advantageously, implementations of the subject technology may use cleaner, human-readable language in communicating permissions information to the user. The page information bubble dialog box may be simplified by removing some combination boxes and distinguishing between the user's options and default selections. Permission grants may be made more visible so that pages may not need to animate arrows pointing out the infobars to the users. In some cases, permissions for core elements of the modern web (e.g., images and JavaScript) may be granted automatically without prompting the user. The permissions may include one or more of the following: "allow local data to be set," "keep local data only until I quit my browser," "block sites from setting any data," "block third-party cookies and site data," "show all images," "do not show any images," or "allow all sites to run JavaScript."

Figure 3A:
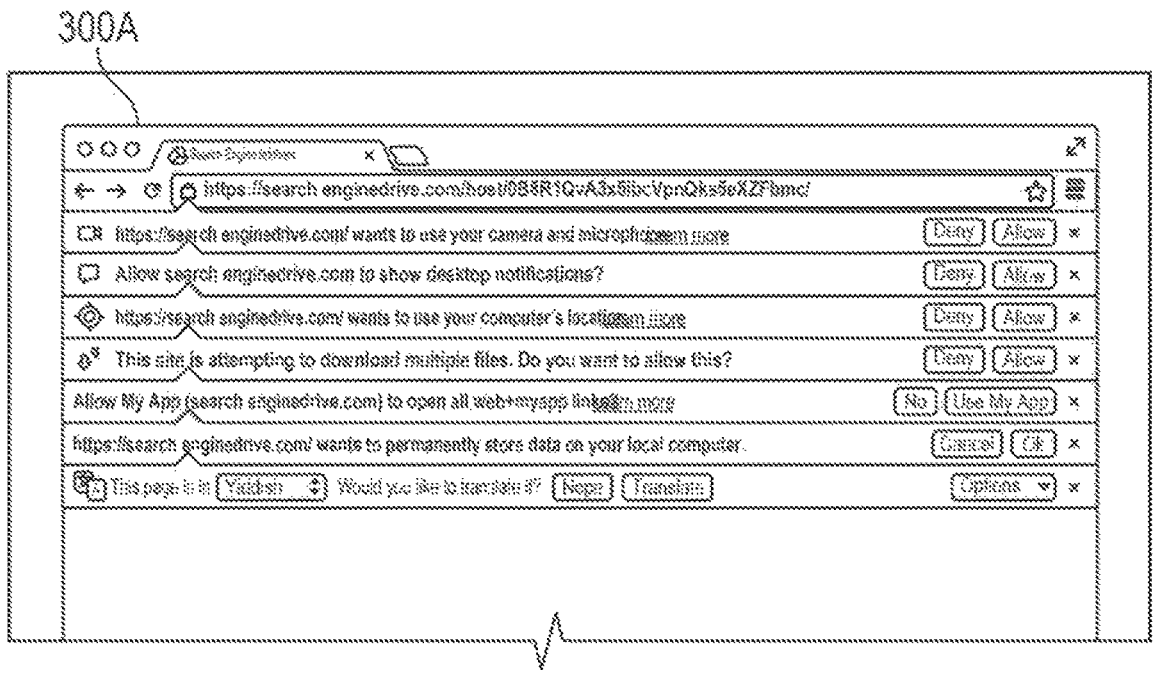
FIGS. 3A-3L illustrate example user interfaces for managing permissions of an application.

FIG. 3A illustrates an example application window 300A displaying a page requesting permissions. As shown, in the application window 300A, multiple permissions prompts are presented at the top of the page, cluttering the interface and possibly overwhelming the user. Also, due to the clutter at the top of the page, reviewing the information on the page may be inconvenient for the user. Some aspects of the subject technology are directed toward improvements of the interface of the application window 300A of FIG. 3A.

Figure 3B:
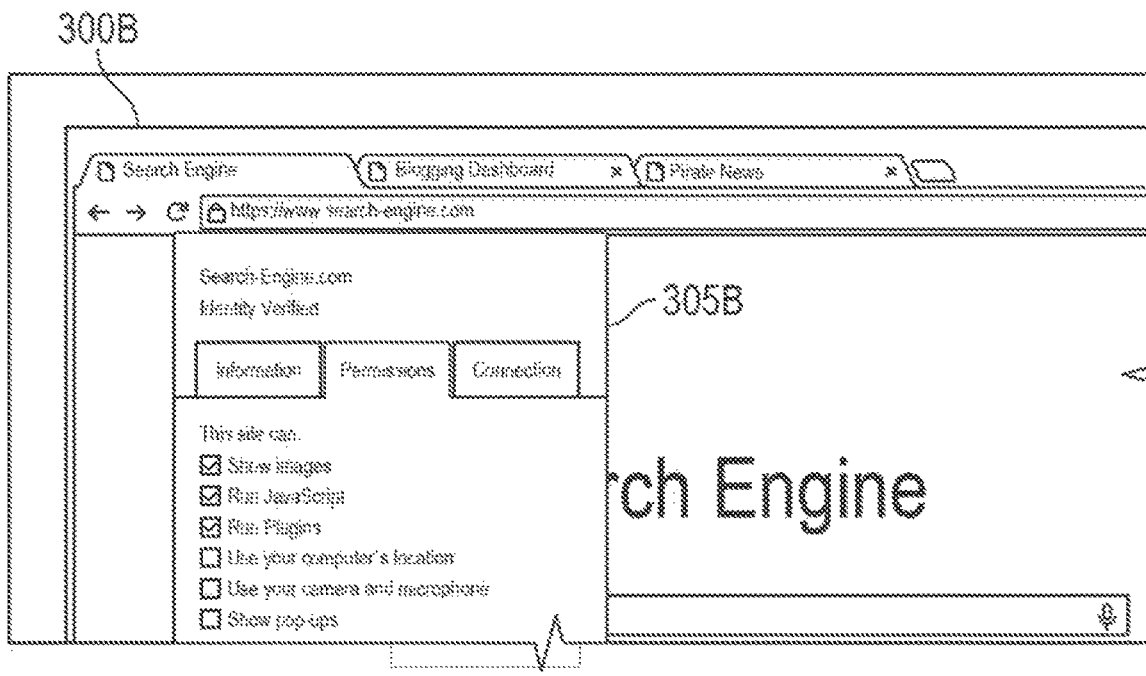

FIG. 3B illustrates an example application window 300B displaying a page requesting permissions. However, unlike application window 300A of FIG. 3A, the application window 300B of FIG. 3B places the permission requests into a page information bubble 305B. Also, the "deny" and "allow" buttons of FIG. 3A are replaced with checkboxes in the page information bubble 305B of FIG. 3B, resulting in a less cluttered and easier to read and review interface. Furthermore, the header of the page information bubble 305B indicates that the identity of the page displayed in the active tab of the application window 300B is verified, possibly making the user feel safer in granting permissions to the page.

Figure 3C:
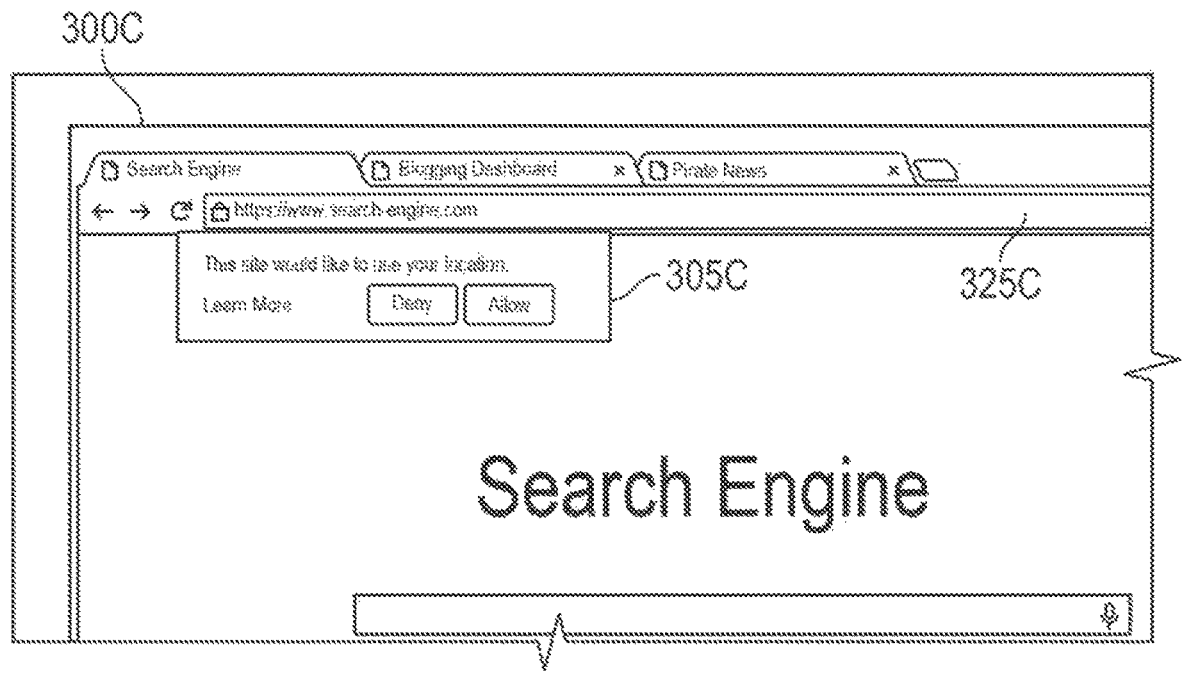

FIG. 3C illustrates an example application window 300C displaying a page requesting permissions. In FIG. 3C, a single permission to "use your location" is requested in a permission bubble 305C adjacent to the omnibox 325C. Alternatively, a URL input box may replace the omnibox 325C. The lock icon in the omnibox indicates that the displayed page requesting the permission to "use your location" is secure, possibly making the user feel safer in granting the permission.

Figure 3D:
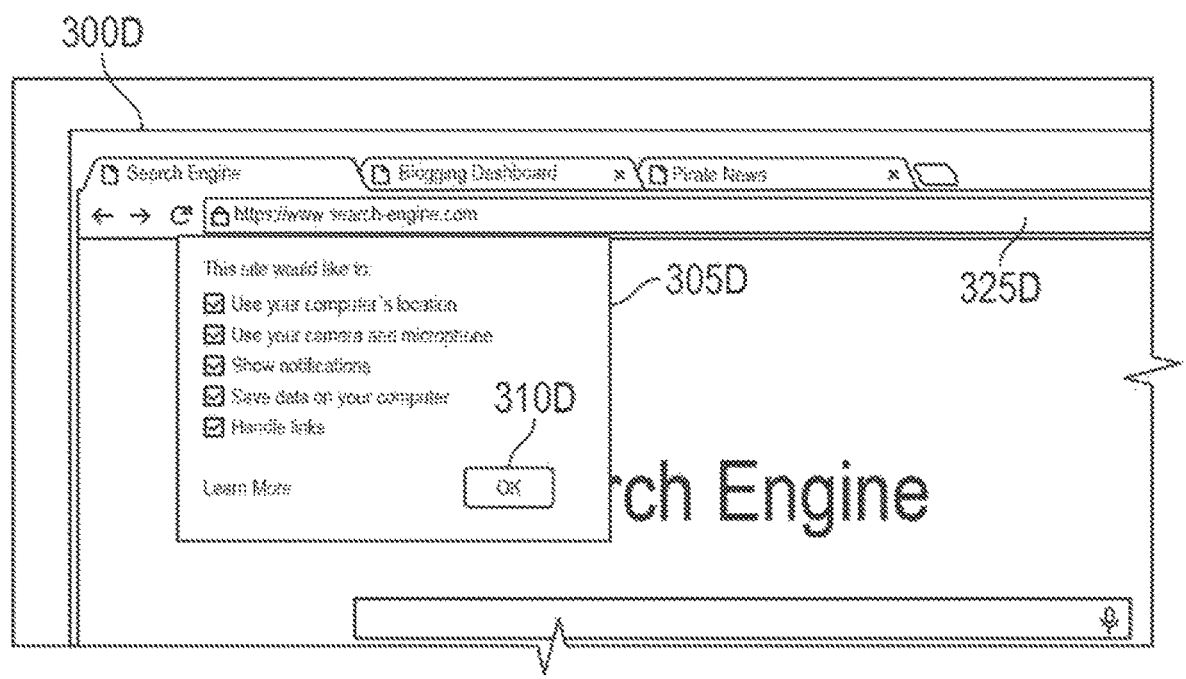

FIG. 3D illustrates an example application window 300D displaying a page requesting permissions. As shown, multiple permissions (e.g., "Use your computer's location," "Use your camera and microphone," etc.) are requested in the permission bubble 305D adjacent to the omnibox 325D. Alternatively, a URL input box may replace the omnibox 325D. The lock icon in the omnibox indicates that the displayed page requesting the multiple permissions is secure, possibly making the user feel safer in granting some or all of the requested permissions. As shown, in FIG. 3D, by default, all of the requested permissions in the permission bubble 305D may be selected and the user may select the ok button 310D to close the permission bubble 305D.

Figure 3E:
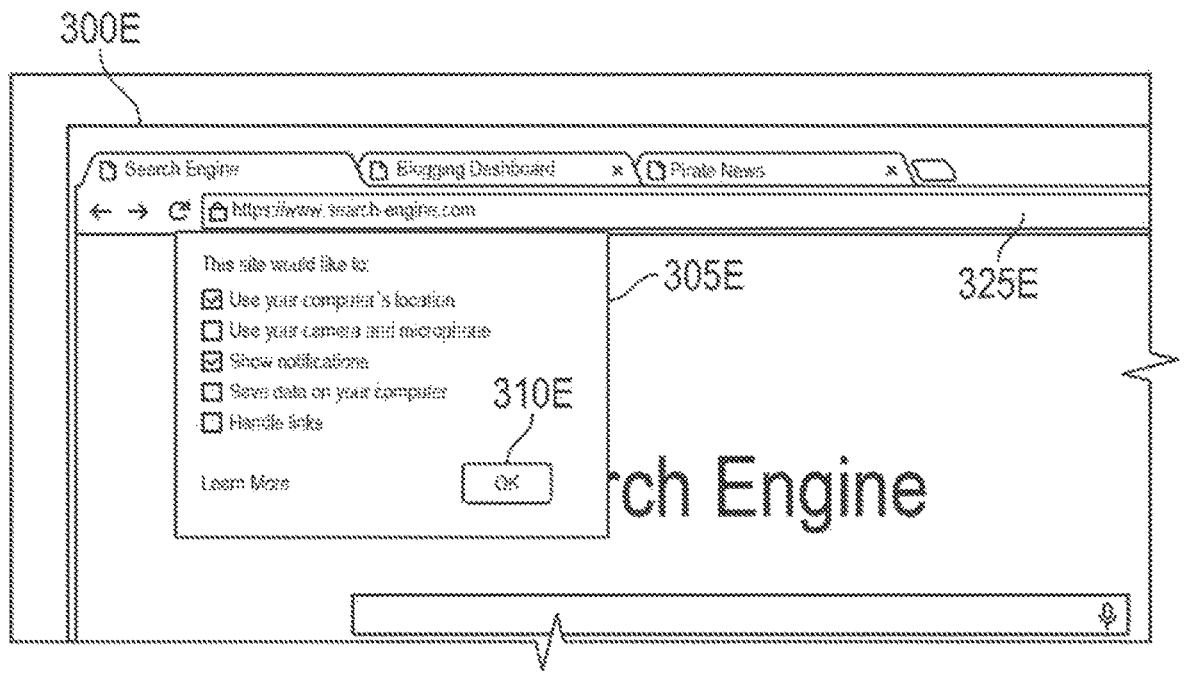

FIG. 3E illustrates an example application window 300E similar to the application window 300D of FIG. 3D. As shown, the application window 300E includes an omnibox 325E (which may be replaced with a URL input box) and a permission bubble 305E with an ok button 310E. However, some of the requested permissions (e.g., "Use your camera and microphone) have been de-selected by the user to deny the page the de-selected requested permissions.

Figure 3F:
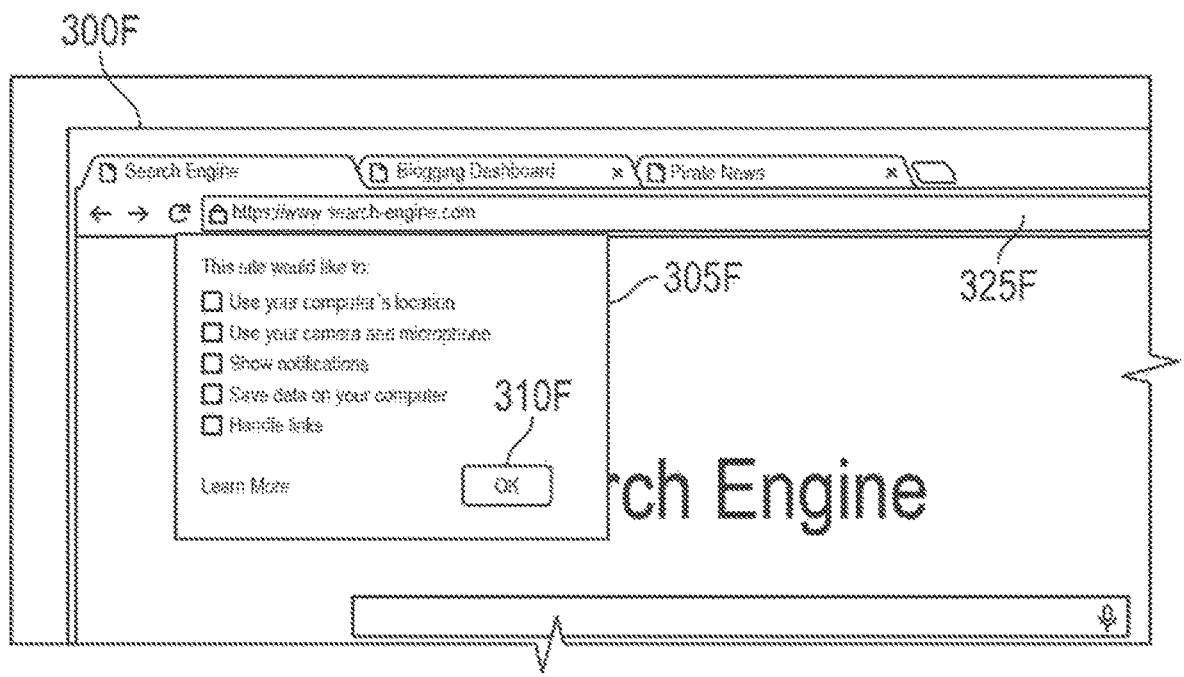

FIG. 3F illustrates an example application window 300F similar to the application windows 300D/300E of FIGS. 3D and 3E. As shown, the application window 300F includes an omnibox 325F (which may be replaced with a URL input box) and a permission bubble 305F with an ok button 310F. However, all of the requested permissions have been de-selected by the user to deny the page all of the requested permissions. Alternatively, the user may deny the page all of the requested permissions by clicking anywhere outside the permission bubble 305D/305E/305F causing the permission bubble 305D/305E/305F to be dismissed.

Figure 3G:
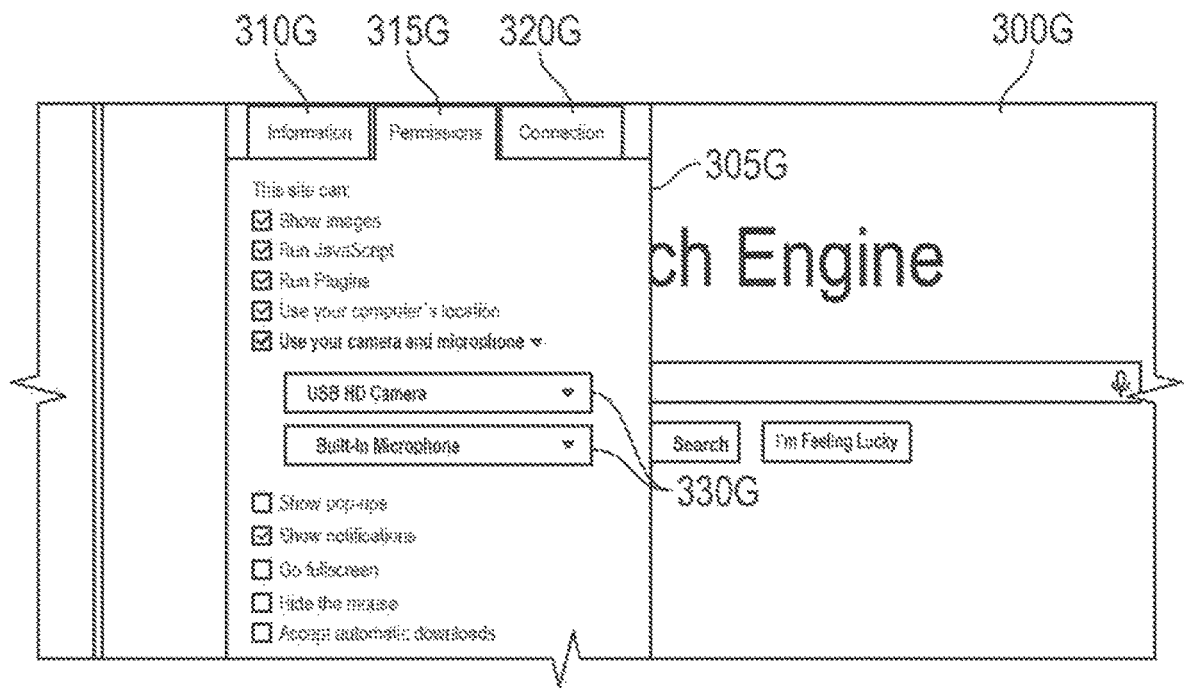

FIG. 3G illustrates an application window 300G with a page information bubble 305G. The page information bubble 305G includes tabs for information 310G, permissions 315G, and connection 320G, where the user may review or edit the associated information. As shown, the permissions tab 215E is selected. Within the permissions tab 315G, multiple checkboxes for granting or denying various permissions (e.g., "Show images," "Run JavaScript," etc.) to the currently displayed page are presented. In some cases, one or more of the checkboxes may be coupled with one or more dropdown menus. For example the "Use your camera and microphone" permission prompt may be coupled with dropdown menu(s) 330G for selecting which of multiple cameras and/or which of multiple microphones should be used.

Figure 3H:
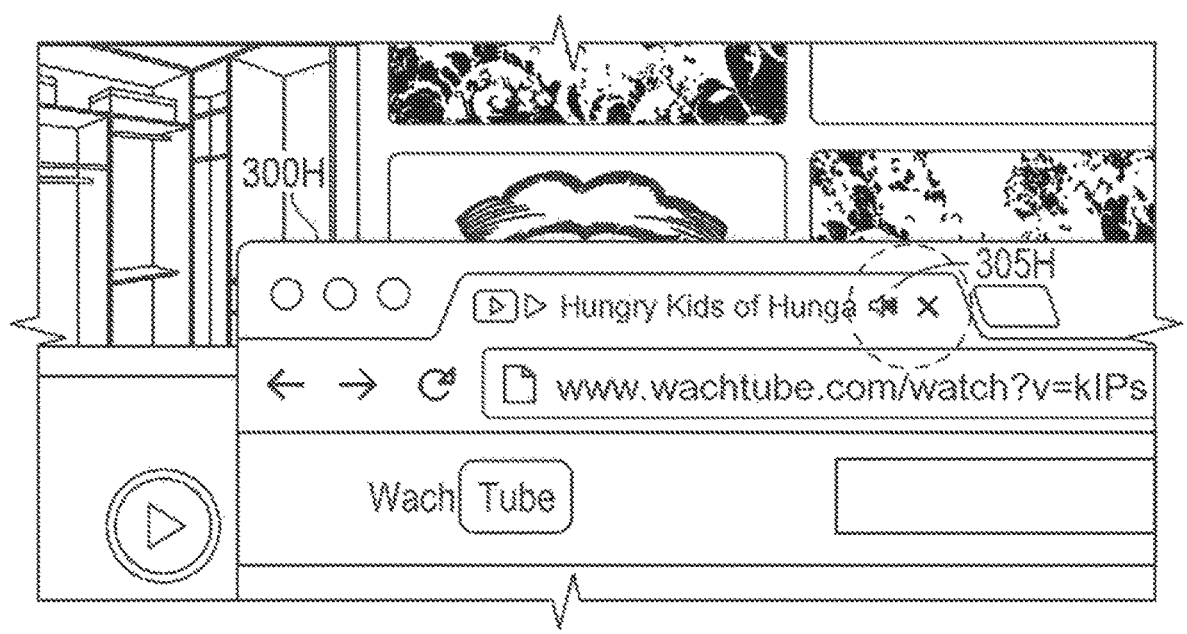

FIG. 3H illustrates an example application window 300H displaying a page requesting permissions. Some sensitive permissions, for example, permissions 305H to access a microphone, may be displayed in a tab indicator of the application window 300H when such permissions are granted to a page displayed in the tab. As a result of this interface, a user may chronically be alerted that he/she is granting sensitive permissions to a tab, even when the tab is inactive. If the user wishes to deny the permissions, for example, to engage in a private conversation, the user may access the tab with the permissions to deny the permissions.

Figure 3I:
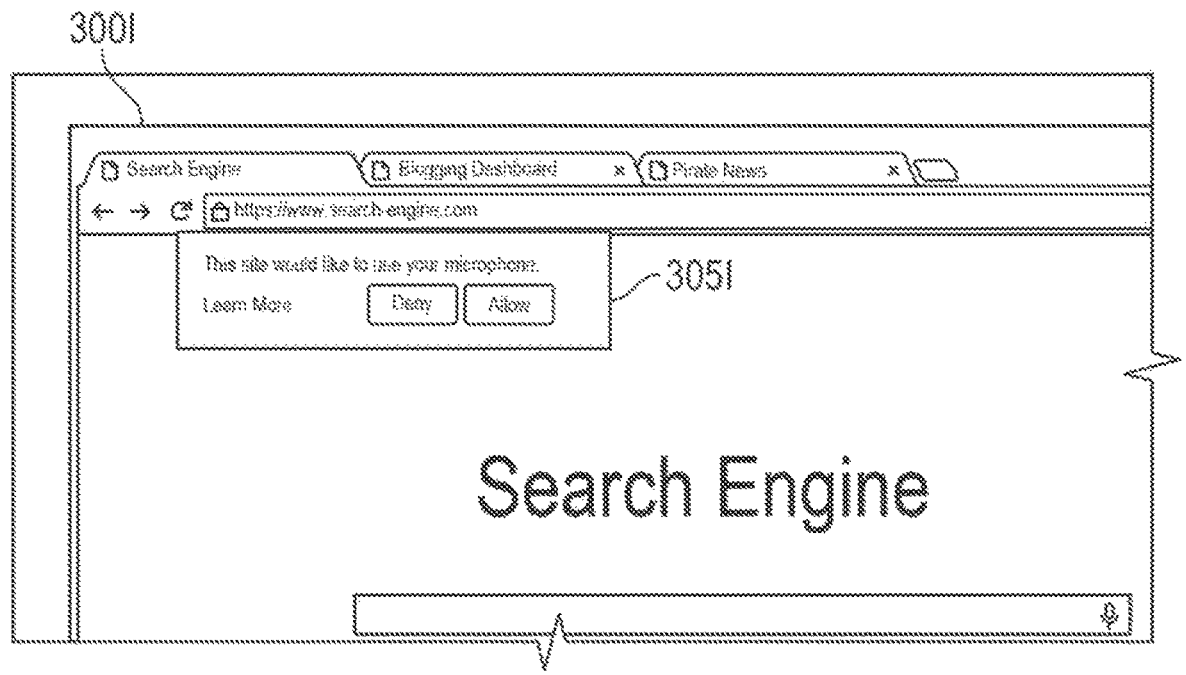
Figure 3J:
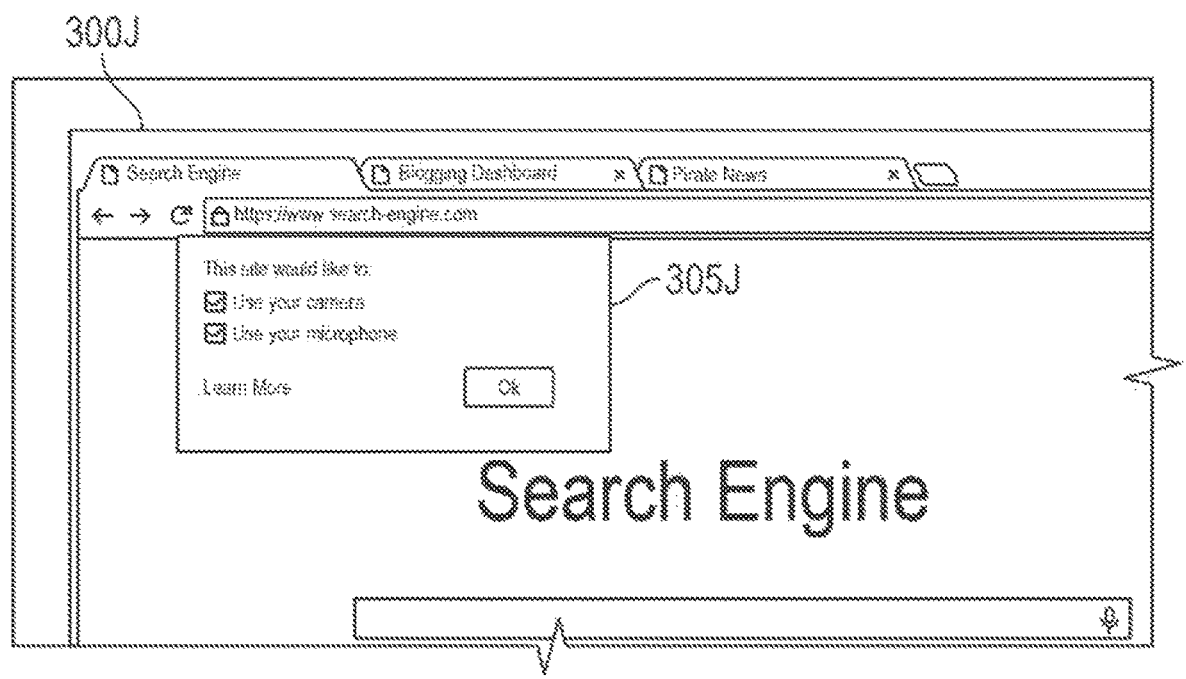

FIG. 3I illustrates an example application window 300I requesting a single permission to "use your microphone" in permission bubble 305I. FIG. 3J illustrates an example application window 300J requesting permissions to "Use your camera" and "Use your microphone" in permission bubble 305J. In some cases, permissions to use a camera and a microphone may be merged and in other cases, permissions to use a camera and a microphone may be separated. As a result, a page for Voice Over Internet Protocol (VOIP) calling may request permission to use only the microphone, a page for taking photographs may request permission to use only the camera, and a page for video calling may request permission to use both the microphone and the camera.

Figure 3K:
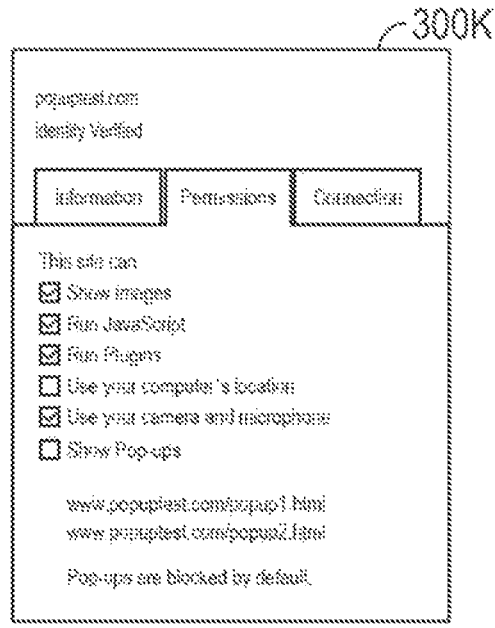

FIG. 3K illustrates an example page information bubble 300K. The page information bubble 305K displaying the permissions tab. As shown, the "show pop-ups" permission is de-selected. The blocked pop-ups that the associated page is attempting to display are shown so that the user may select one or more of the blocked pop-ups if the user wishes to view the blocked pop-ups.

Figure 3L:
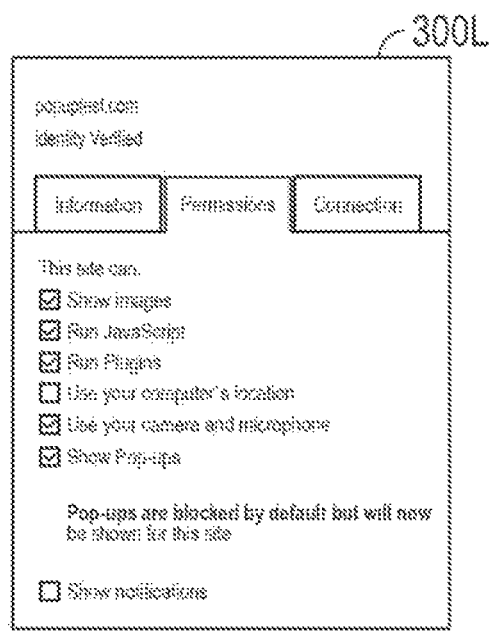

FIG. 3L illustrates an example page information bubble 300L similar to the page information bubble 300K of FIG. 3K. However, the "show pop-ups" permission is selected in FIG. 3L. As a result, the pop-ups that were blocked in FIG. 3L are now shown and, in some cases, may no longer be indicated in the page information bubble 300L. Instead, the page information bubble 300L may inform the user that "Pop-ups are blocked by default but will now be shown for this site."

Figure 4A:
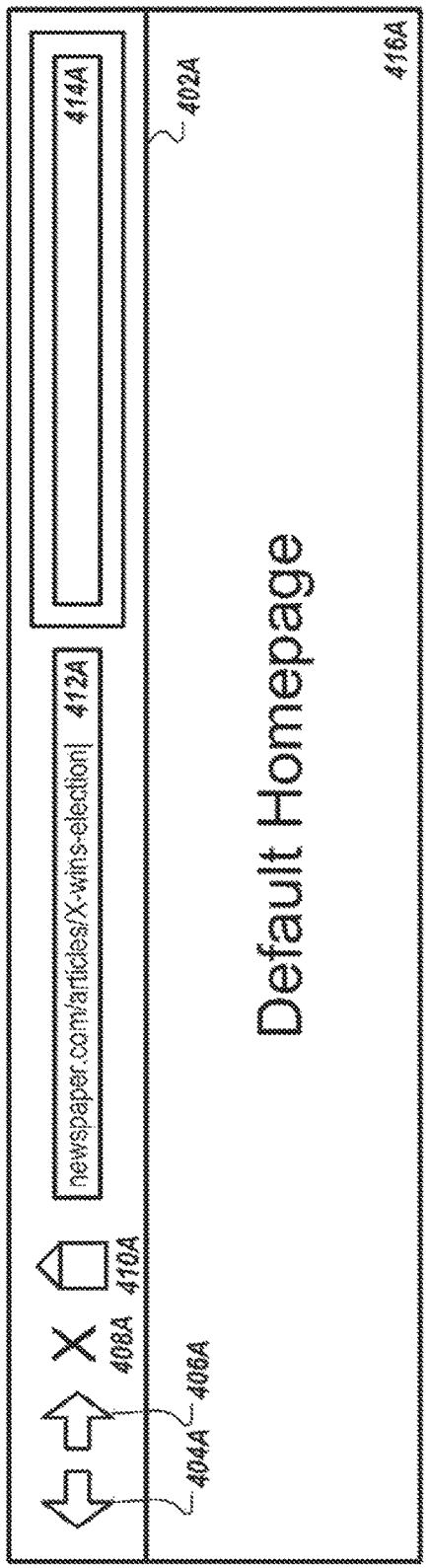
FIGS. 4A-4B illustrate example windows of a web browsing application.
Figure 4B:
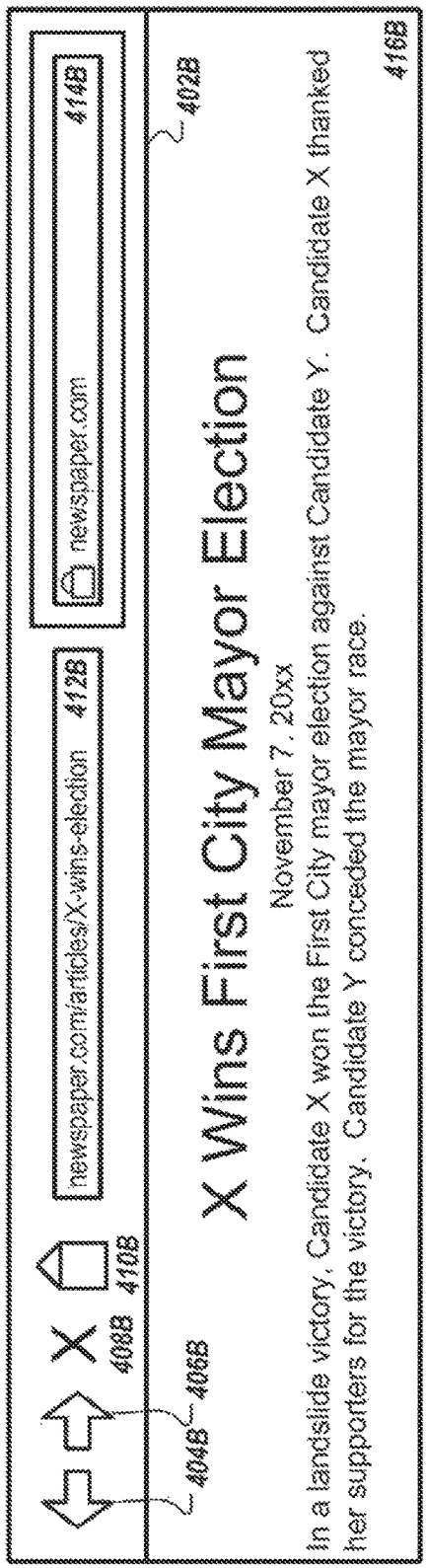

FIGS. 4A-4B illustrate example windows of a web browsing application.

FIG. 4A illustrates an application window 400A. The application window 400A may be a window of a web browser application or another application. As shown, the application window 400A includes a header region 402A and a page display region 416A. The page display region 416A displays a default homepage.

The header region 402A includes a back button 404A, a forward button 406A, a stop button 408A, a home button 410A, an omnibox 412A, and a chip 414A. The back button 404A, when selected, causes the application to display a previously displayed page in the page display region 416A. The forward button 406A, when selected, causes the application to display a next page in a sequence in the page display region 416A, undoing the operation of the back button 404A. The stop button 408A, when selected, causes the application to stop loading a currently displayed page. The home button 410A, when selected, causes the application to display the default homepage in the page display region 416A. The omnibox 412A allows a user to enter a URL or search query input for causing the page display region 416A to display a page corresponding to the URL or the search query. As shown, the user is entering a URL ("newspaper.com/articles/X-wins-election") into the omnibox 412A. As shown, the chip 414A is blank. However, in some cases, the chip 414A may display information about a currently displayed page in the page display region 416A, for example, its URL. After the user finishes entering the URL in the omnibox 412A and presses the "Enter" key on the keyboard, the application window 400A of FIG. 4A may transform into an application window 400B of FIG. 4B.

FIG. 4B illustrates the application window 400B, which may be presented after the user finishes entering the URL in the omnibox 412A of FIG. 4A and presses the "Enter" key on the keyboard. Similarly to FIG. 4A, the application window 400B of FIG. 4B includes a header region 402B and a page display region 416B. The page display region 416B displays a page corresponding to the URL entered by the user in the omnibox 412A of FIG. 4A.

The header region 402A includes a back button 404B, a forward button 406B, a stop button 408B, a home button 410B, an omnibox 412B, and a chip 414B. The back button 404B, the forward button 406B, the stop button 408B, and the home button 410B operate similarly to the back button 404A, the forward button 406A, the stop button 408A, and the home button 410A of FIG. 4A. As shown in FIG. 4B, the URL of the page displayed in the page display region 416B is presented in the omnibox 412B. The chip 414B presents other information about the URL, including the top-level domain of the URL ("newspaper.com"). In some cases, the chip 414B may also present a hierarchy of the URL (e.g., "newspaper.com>X-wins-election"). In some cases, other user interface elements may be presented in the chip 414B. For instance, as shown, the chip 414B may include a closed lock icon to indicate that the page displayed in the page display region 416B is secure or that a connection to the page is strong. Alternatively, the chip 414B may include an open lock icon to indicate that the page displayed in the page display region 416B is not secure or that the connection to the page is weak, and/or a top-level domain of the page displayed in the page display region 416B. Furthermore, while the chip 414B is illustrated as being to the right of the omnibox 412B, in some cases, the chip 414B may be to the left, above, below, or at any other side of the omnibox 412B. The chip 414B may have any of multiple functions. In some cases, selecting the chip 414B may cause the root of the page displayed in the page display region 416B to be displayed in the page display region 416B. In some cases, selecting the chip 414B may resurface the URL presented in the omnibox 412B. Dragging the chip 414B to a bookmark button may cause a bookmark to the page displayed in the page display region 416B (corresponding to the URL presented in the omnibox 412B) to be created. Furthermore, the chip 414B may show security status information or any other status information, such as whether the page is completely loaded or in the process of loading, whether the page is permitted to store cookies, whether the page is bookmarked, etc. Alternatively, some or all extra functionality may be kept in the "actions" area in the toolbar rather than on the chip 414B.

Advantageously, as a result of the implementations described in FIGS. 4A-4B, the user may see information different from a URL in the omnibox 412A/412B and may be prompted to learn that the omnibox 412A/412B may accept search query input(s) as well as URL input(s). Furthermore, the user may be able to more easily see (e.g., in the omnibox 412B) the top-level domain and the hierarchy of the URL to determine whether the URL is authentic (e.g., an authentic bank page) or inauthentic (e.g., a hacker imitating a bank page to obtain account numbers or passwords).

Figure 5:
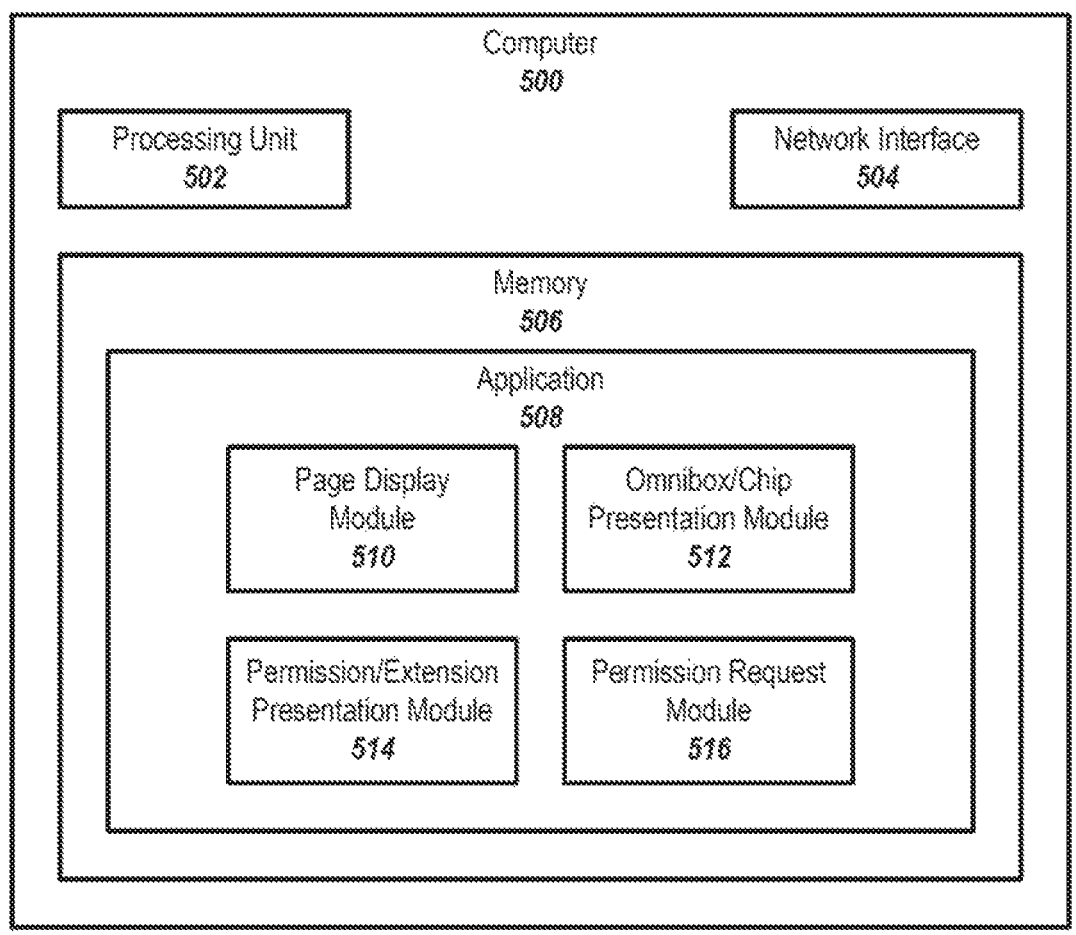
FIG. 5 illustrates an example computer that may provide a user interface for a web browsing application.

FIG. 5 illustrates an example computer 500 that may provide a user interface for a web browsing application. The computer 500 may be a laptop computer, a desktop computer, a mobile phone, a tablet computer, a personal digital assistant (PDA), a digital music player, a smart watch, etc.

As shown, the computer 500 includes a processing unit 502, a network interface 504, and a memory 506. The processing unit 502 includes one or more processors. The processing unit 502 may include a central processing unit (CPU), a graphics processing unit (GPU), or any other processing unit. The processing unit 502 executes computer instructions that are stored in a computer-readable medium, for example, the memory 506. The network interface 504 allows the computer 500 to transmit and receive data in a network, for example, a local area network, a wide area network, a wired network, a wireless network, the Internet, a cellular network, etc. The memory 506 stores data and/or instructions. The memory 506 may be one or more of a cache unit, a storage unit, an internal memory unit, or an external memory unit. As illustrated, the memory 506 includes an application 508. The application 508 may be a web browser or any other application. As shown, the application 508 includes a page display module 510, an omnibox/chip presentation module 512, a permission/extension presentation module 514, and a permission request module 516.

The page display module 510 stores instructions that may be executed by the processing unit 502. When executing the page display module 510, the processing unit 502 receives, in an omnibox (e.g., omnibox 412A) of an application window (e.g., application window 400A), an input including a URL. The processing unit 502 presents, in a page display region (e.g., page display region 416A/416B) of the application window, a page corresponding to the URL.

Simultaneously with or after executing the page display module 510, the processing unit may execute the omnibox/chip presentation module 512. When executing the omnibox/chip presentation module 512, the processing unit 502 presents, in the omnibox, the URL. The processing unit 502 presents, in the chip, the essence or collapsed form of the URL. The essence or collapsed form of the URL includes a representation of a top-level domain and a hierarchy of the URL. The essence of the URL includes different text from the URL itself.

The permission/extension presentation module 514 stores instructions that may be executed by the processing unit 502 simultaneously with or after executing the page display module 510. When executing the permission/extension presentation module 514, the processing unit 502 presents, in a header region (e.g., header region 402A/402B) of the application window and externally to the omnibox, one or more graphical elements. The graphical elements (e.g., icons 105A.1-9 or icon 305H) represent permissions granted to the displayed page or extensions having access to the page. The omnibox may include text and may lack graphical elements distinct from the text.

The permission request module 516 stores instructions that may be executed by the processing unit 502 simultaneously with or after executing the page display module 510. When executing the permission request module 516, the processing unit 502 receives, via the page displayed within the page request region, a request for one or more permissions. The processing unit 502 provides, within a bubble (e.g., bubble 205E, 205F, 205G, 305B, 305C, 305D, 305E, 305F, 305G, 305I, 305J) overlaying the page display region and adjacent to the header region of the application, a textual indication of the request for the one or more permissions. The processing unit 502 receives, via the bubble, a user input for granting or denying the request for at least one of the one or more permissions.

Figure 6:
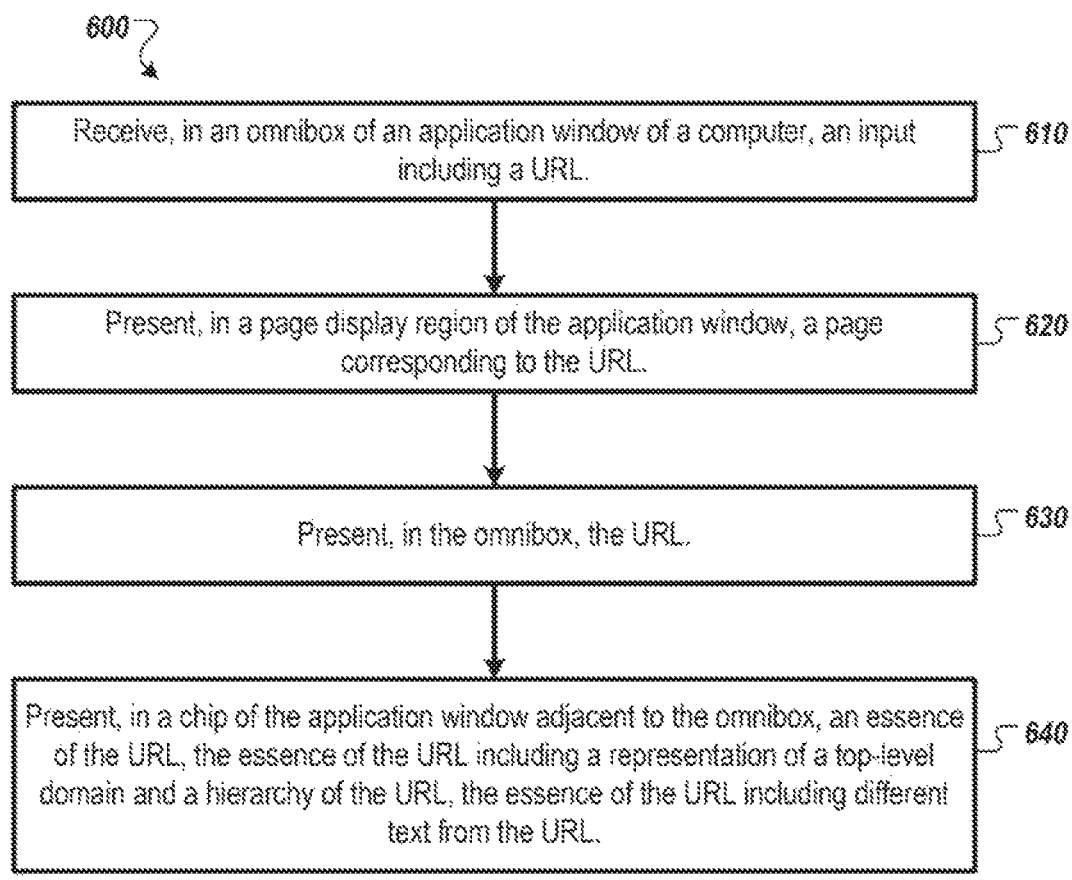
FIG. 6 illustrates an example process by which an essence of a uniform resource locator may be presented.

FIG. 6 illustrates an example process 600 by which an essence of a uniform resource locator may be presented.

The process 600 begins at step 610, where a computer receives, in an omnibox (e.g., omnibox 412A) of an application window (e.g., application window 400A) of the computer, an input including a URL.

In step 620, the computer presents, in a page display region (e.g., page display region 416A/416B) of the application window, a page corresponding to the URL.

In step 630, the computer presents, in the omnibox of the application window adjacent to the omnibox, the URL.

In step 640, the computer presents, in a chip (e.g., chip 414A/414B) of the application window adjacent to the omnibox, the essence of the URL. The essence of the URL includes a representation of the top-level domain and a hierarchy of the URL. The essence of the URL includes different text from the URL. The top-level domain includes domain(s) at the highest level in the hierarchical Domain Name System (DNS) of the Internet. The hierarchy may include one or more additional domain(s) in addition to the top-level domain. The essence of the URL includes text different from the URL itself. The omnibox may include text and may lack graphical elements representing permissions or extensions. Graphical element(s) (e.g., icons 105A.1-9) representing permissions or extensions may be presented in a header region of the application window and externally to the omnibox According to some examples, the computer may receive a selection of the chip. Responsive to the selection of the chip, the computer may present, in a bubble (e.g., bubble 205F or 205G) adjacent to the chip, page data associated with the page in the page display region. The bubble may be a dropdown below the chip. The page data may include information about page visiting history, information about cookies related to the page, information about permissions, information about connections, and/or information about extensions. The permissions may include permissions to show images, permissions to access a microphone or camera, permissions to determine a geographic location of the computer, permissions to run code in a scripting language (e.g., JavaScript), permissions to run a plug-in, or permissions to store cookies. The permissions are editable (e.g., may be granted or denied) by a user of the computer. The information about extensions may include a list of extensions running in the application and having access to the page. The extensions in the list of extensions are editable or removable by the user of the computer.

According to some implementations, the computer may receive, from the page, a request for one or more permissions. The computer may present, in a bubble (e.g., bubble 205F or 205G) adjacent to the omnibox or the chip, the request for the one or more permissions for approval or denial by the user. In an event that the user fails to respond to the request for the one or more permissions during a predetermined time period (e.g., five minutes, ten minutes, one hour, etc.), the computer may re-present the bubble after the expiration of the predetermined time period.

The page may be presented in a tab of an application. A tab indicator of the tab of the application may include a graphical element (e.g., graphical element 305H) indicating that a sensitive permission (e.g., a permission to access a camera, a microphone, or geographic location information) was granted to the page. The computer may receive a selection of the graphical element. The computer may provide, in response to the selection of the graphical element, an interface for granting or denying the sensitive permission to the page. After step 640, the process 600 ends.

Figure 7:
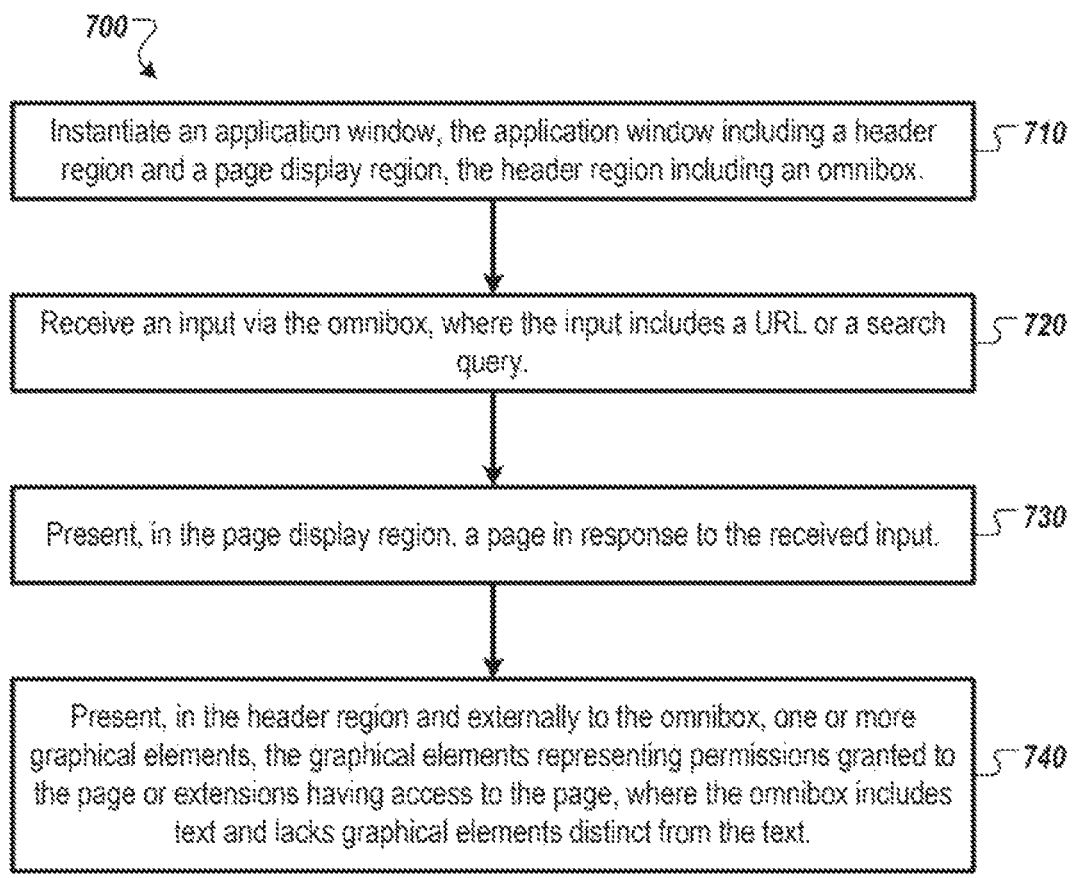
FIG. 7 illustrates an example process by which permissions granted to a page or an extension having access to the page may be presented.

FIG. 7 illustrates an example process 700 by which permissions granted to a page or an extension having access to the page may be presented.

The process 700 begins at step 710, where a computer instantiates an application window (e.g., application window 400A). The application window includes a header region (e.g., header region 402A) and a page display region (e.g., page display region 416A). The header region includes an omnibox (e.g., omnibox 412A).

In step 720, the computer receives an input via the omnibox. The input includes a URL (e.g., "example.com") or a search query (e.g. "ski travel destinations").

In step 730, the computer presents, in the page display region, a page in response to the received input.

In step 740, the computer presents, in the header region and externally to the omnibox, one or more graphical elements. The graphical elements represent permissions granted to the page (e.g., graphical element 305H) or extensions having access to the page (e.g., icons 105B.1-2). The omnibox includes text and lacks graphical elements distinct from the text. The text may include the URL or the search query received in the input of step 720. Alternatively, the text may include the essence of the URL presented in the page display region in response to the input. The essence of the URL includes a representation of the top-level domain of the URL and a hierarchy of the URL. The essence of the URL includes different text from the URL itself, and the URL itself may be presented in a chip (e.g., chip 414B) adjacent to the omnibox.

In some cases, the computer may receive a selection of an overflow indicator or menu button (e.g., menu button 110A or 110B) of the header region. The computer may present, in response to the selection of the overflow indicator or menu button and in a dropdown from the header region, additional graphical elements (e.g., icons 105B.3-9) representing additional permissions granted to the page or additional extensions having access to the page. The additional graphical elements are different from the graphical elements in the header region. After step 740, the process 700 ends.

Figure 8:
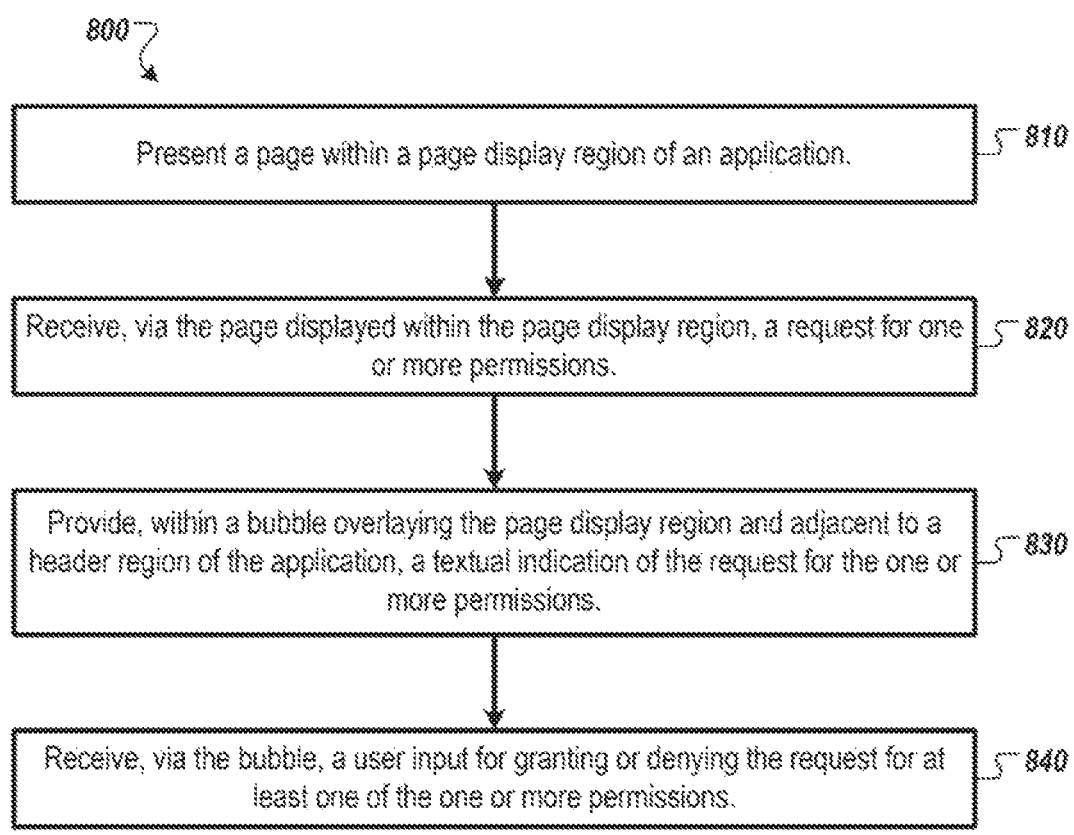
FIG. 8 illustrates an example process by which a page may request permissions from a user.

FIG. 8 illustrates an example process 800 by which a page may request permissions from a user.

The process 800 begins at step 810, where a computer running an application (e.g., application 508, associated with application windows 400A/400B) presents a page within a page display region (e.g., page display region 416A/416B) of the application.

In step 820, the computer receives, via the page displayed within the page display region, a request for one or more permissions. For example, the page may request permissions to show images, access a microphone or camera, determine a geographic location of the computer, run code in a scripting language, run a plug-in, or store cookies.

In step 830, the computer provides, within a bubble (e.g., bubble 305B, 305C, 305D, 305E or 305F) overlaying the page display region and adjacent to a header region (e.g., header region 402A/402B) of the application, a textual indication of the request for the one or more permissions. The one or more permissions may include a single permission, and the bubble (e.g., bubble 305C) may include an allow button for granting the request for the single permission and a deny button for denying the request for the single permission. Alternatively, the one or more permissions may include multiple permissions, and the bubble (e.g., bubble 305B, 305D, 305E or 305F) may include a list of the multiple permissions. Each permission in the list may be adjacent to a check box for granting or denying the request for the adjacent permission. Furthermore, the computer may present, within the bubble, an indication of the top-level domain of the page and an indication whether the top-level domain is verified.

In step 840, the computer receives, via the bubble, a user input for granting or denying the request for at least one of the one or more permissions. After step 840, the process 800 ends.

While examples of the subject technology are described herein as being implemented on a laptop or desktop computer with a mouse-based interface, the subject technology may also be implemented on other machine(s) with other interface(s). For instance, the subject technology may be implemented on a mobile device, such as a mobile phone or a tablet computer, with a touch screen interface. Furthermore, in some cases, the user may have multiple tabs of the same domain open. The permission(s) may be synced across the multiple tabs, or different tabs may have different permissions.

Figure 9:
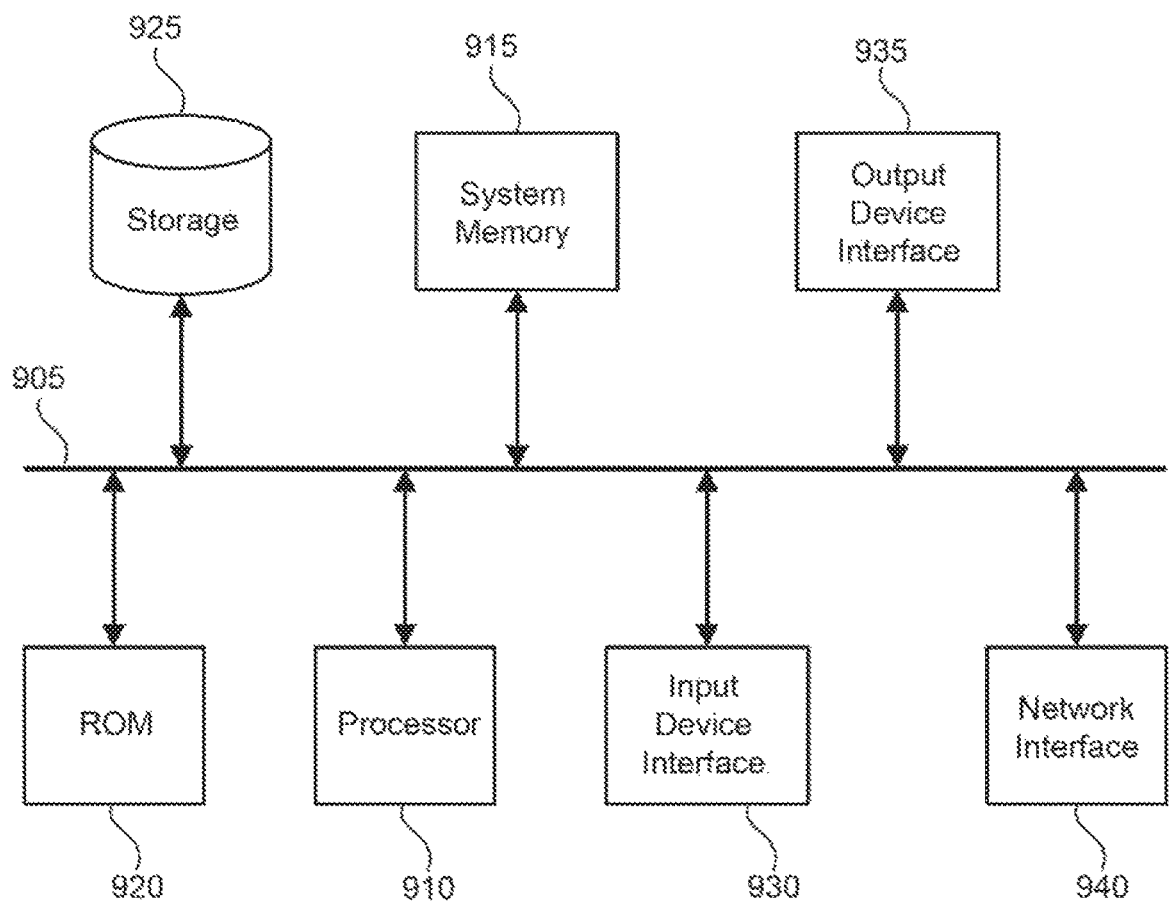
FIG. 9 conceptually illustrates an example electronic system with which some implementations of the subject technology are implemented.

FIG. 9 conceptually illustrates an electronic system 900 with which some implementations of the subject technology are implemented. For example, the computer 500 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925.

From these various memory units, the processing unit(s) 910 retrieves instructions to execute and data to process in order to execute the processes of the subject technology. The processing unit(s) can be a single processor or a multi-core processor in different implementations.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for providing a user interface for an application displaying pages in accordance with some implementations. From these various memory units, the processing unit(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example cathode ray tubes (CRT) or liquid crystal displays (LCD). Some implementations include devices for example a touch screen that functions as both input and output devices.

Finally, as shown in FIG. 9, bus 905 also couples electronic system 900 to a network (not shown) through a network interface 940. In this manner, the electronic system 900 can be a part of a network of computers (for example a local area network (LAN), a wide area network (WAN), or an Intranet, or a network of networks, for example the Internet. Any or all components of electronic system 900 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method comprising:
   presenting, in a page display region of an application window, a page based on a user input;
   presenting, in a header region external to the page display region of the application window, a first graphical element representing permissions associated with the page;
   receiving a selection of the first graphical element;
   responsive to receiving the selection, presenting a plurality of selectable permission options for granting or denying a respective plurality of permissions to the page,
   wherein an unselected permission option of the plurality of selectable permission options is visually displayed differently from a granted permission option and a denied permission option, and wherein a selection of a permission option grants or denies a respective permission to the page;
   receiving a selection of a first permission option of the plurality of selectable permission options granting a first permission to the page;
   responsive to granting the first permission to the page, generating a notification indicating that the first permission has been granted to the page;
   determining that the first permission remains granted after a predetermined period of time; and
   based on the determination, re-generating the notification until receiving a selection of the permission option to deny the first permission to the page.

2. The method of claim 1, further comprising:
   receiving, in an omnibox in the header region of the application window, the user input.

3. The method of claim 2, wherein the first graphical element is within the omnibox.

4. The method of claim 1, further comprising:
   receiving a selection of a second permission option of the plurality of selectable permission options granting a second permission to the page; and
   presenting, in a tab associated with the page in the application window, an indicator of the granted second permission.

5. The method of claim 1, further comprising:
   presenting, in the header region of the application window, a second graphical element representing extensions associated with the page;
   receiving a selection of the second graphical element; and
   responsive to receiving the selection of the second graphical element, presenting one or more graphical representations of the extensions associated with the page.

6. The method of claim 5, wherein the selection of the second graphical element comprises a hover event associated with the second graphical element.

7. The method of claim 5, comprising:
   determining an amount of a random access memory (RAM) for retaining an extension;
   determining that the amount of RAM for retaining the extension satisfies a threshold amount; and
   displaying the extension visually differently from other extensions that do not satisfy the threshold amount.

8. The method of claim 1, further comprising:
   presenting, in the header region of the application window, a third graphical element representing information associated with the page, wherein the information comprises domain information and connection information.

9. A non-transitory computer-readable medium comprising instructions which, when executed by a computer, cause the computer to perform operations comprising:
   presenting, in a page display region of an application window, a page based on a user input;
   presenting, in a header region external to the page display region of the application window, a first graphical element representing permissions associated with the page;
   receiving a selection of the first graphical element;
   responsive to receiving the selection, presenting a plurality of selectable permission options for granting or denying a respective plurality of permissions to the page,
   wherein an unselected permission option of the plurality of selectable permission options is visually displayed differently from a granted permission option and a denied permission option, and wherein a selection of a permission option grants or denies a respective permission to the page;

receiving a selection of a first permission option of the plurality of selectable permission options granting a first permission to the page;

responsive to granting the first permission to the page, generating a notification indicating that the first permission has been granted to the page;

determining that the first permission remains granted after a predetermined period of time; and based on the determination, re-generating the notification until receiving a selection of the permission option to deny the first permission to the page.

10. The non-transitory computer-readable medium of claim 9, wherein the operations further comprising:
receiving, in an omnibox in the header region of the application window, the user input.

11. The non-transitory computer-readable medium of claim 10, wherein the first graphical element is within the omnibox.

12. The non-transitory computer-readable medium of claim 9, wherein the operations further comprising:
receiving a selection of a second permission option of the plurality of selectable permission options granting a second permission to the page; and
presenting, in a tab associated with the page in the application window, an indicator of the granted second permission.

13. The non-transitory computer-readable medium of claim 9, wherein the operations further comprising:
presenting, in the header region of the application window, a second graphical element representing extensions associated with the page;
receiving a selection of the second graphical element; and
responsive to receiving the selection of the second graphical element, presenting one or more graphical representations of the extensions associated with the page.

14. The non-transitory computer-readable medium of claim 13, wherein the selection of the second graphical element comprises a hover event associated with the second graphical element.

15. The non-transitory computer-readable medium of claim 13, wherein the operations further comprising:
determining an amount of a random access memory (RAM) for retaining an extension;
determining that the amount of RAM for retaining the extension satisfies a threshold amount; and
displaying the extension visually differently from other extensions that do not satisfy the threshold amount.

16. The non-transitory computer-readable medium of claim 9, wherein the operations further comprising:
presenting, in the header region of the application window, a third graphical element representing information associated with the page, wherein the information comprises domain information and connection information.

17. A system comprising:
one or more processors; and
a memory comprising instructions, which when executed by the one or more processors cause the system to:
present, in a page display region of an application window, a page based on a user input;
present, in a header region external to the page display region of the application window, a first graphical element representing permissions associated with the page;
receive a selection of the first graphical element;
responsive to receiving the selection, present a plurality of selectable permission options for granting or denying a respective plurality of permissions to the page,
wherein an unselected permission option of the plurality of selectable permission options is visually displayed differently from a granted permission option and a denied permission option, and wherein a selection of a permission option grants or denies a respective permission to the page;
receive a selection of a first permission option of the plurality of selectable permission options granting a first permission to the page;
responsive to granting the first permission to the page, generate a notification indicating that the first permission has been granted to the page;
determine that the first permission remains granted after a predetermined period of time; and
based on the determination, re-generate the notification until receiving a selection of the permission option to deny the first permission to the page.

18. The system of claim 17, wherein the instructions further cause the system to receive, in an omnibox in the header region of the application window, the user input.

19. The system of claim 18, wherein the first graphical element is within the omnibox.

20. The system of claim 17, wherein the instructions further cause the system to:
receive a selection of a second permission option of the plurality of selectable permission options granting a second permission to the page; and
present, in a tab associated with the page in the application window, an indicator of the granted second permission.

* * * * *